US012089244B2

(12) United States Patent
Zhang et al.

(10) Patent No.: US 12,089,244 B2
(45) Date of Patent: Sep. 10, 2024

(54) BEAM PAIR INDICATION AND BEAM RESET AFTER BEAM FAILURE RECOVERY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(*) Notice: Subject to any disclaimer, the term of this patent is extended or adjusted under 35 U.S.C. 154(b) by 449 days.

(21) Appl. No.: 17/470,259

(22) Filed: Sep. 9, 2021

(65) Prior Publication Data
US 2022/0086857 A1 Mar. 17, 2022

Related U.S. Application Data

(60) Provisional application No. 63/079,380, filed on Sep. 16, 2020.

(51) Int. Cl.
*H04W 72/542* (2023.01)
*H04B 7/0408* (2017.01)
*H04L 5/00* (2006.01)
*H04L 5/14* (2006.01)
*H04W 72/02* (2009.01)
*H04W 72/044* (2023.01)
*H04W 74/00* (2009.01)
*H04W 74/0833* (2024.01)

(52) U.S. Cl.
CPC ........ *H04W 72/542* (2023.01); *H04B 7/0408* (2013.01); *H04L 5/0032* (2013.01); *H04L 5/0055* (2013.01); *H04L 5/1469* (2013.01); *H04W 72/02* (2013.01); *H04W 72/044* (2013.01); *H04W 74/004* (2013.01); *H04W 74/0833* (2013.01)

(58) Field of Classification Search
CPC . H04W 72/542; H04W 72/02; H04W 72/044; H04W 74/004; H04W 74/0833; H04B 7/0408; H04B 7/0695; H04B 7/088; H04L 5/0032; H04L 5/0055; H04L 5/1469
See application file for complete search history.

(56) References Cited

U.S. PATENT DOCUMENTS

2018/0138962 A1\* 5/2018 Islam .................... H04L 5/0032
2018/0152957 A1\* 5/2018 Zhang .................. H04W 72/54
2019/0053314 A1\* 2/2019 Zhou .................... H04B 7/0695

FOREIGN PATENT DOCUMENTS

WO    WO-2018129300 A1 \* 7/2018    .......... H04B 7/0695

\* cited by examiner

*Primary Examiner* — Ian N Moore
*Assistant Examiner* — Latresa A McCallum

(57) ABSTRACT

A user equipment (UE) detects a beam failure for a first beam pair being used for full duplex communication with a base station. The UE indicates the second beam pair for the full duplex communication to the base station to the base station. The UE applies the second beam pair for full duplex communication a period of time after indicating the second beam pair to the base station. The base station receives a beam failure recovery request (BFRQ) from the UE, the BFRQ indicating a beam failure for a first beam pair for full duplex communication at the UE. The base station receives an indication of a second beam pair selected by the UE for the full duplex communication at the UE that the UE will apply a period of time after the indication.

15 Claims, 22 Drawing Sheets

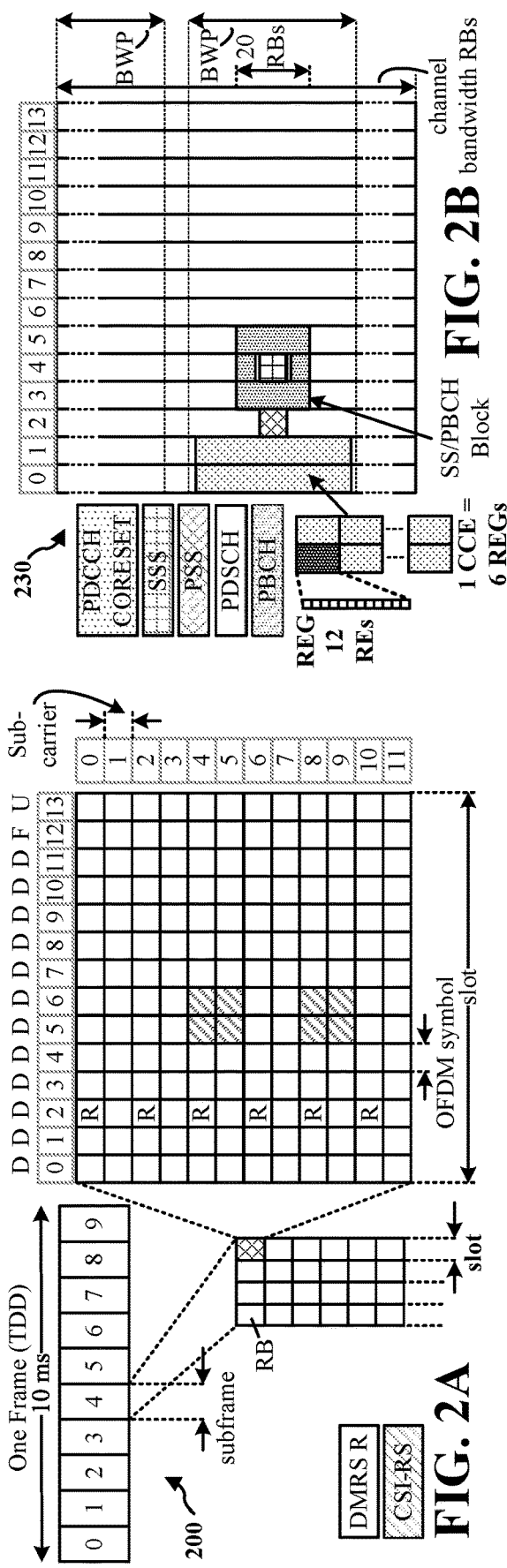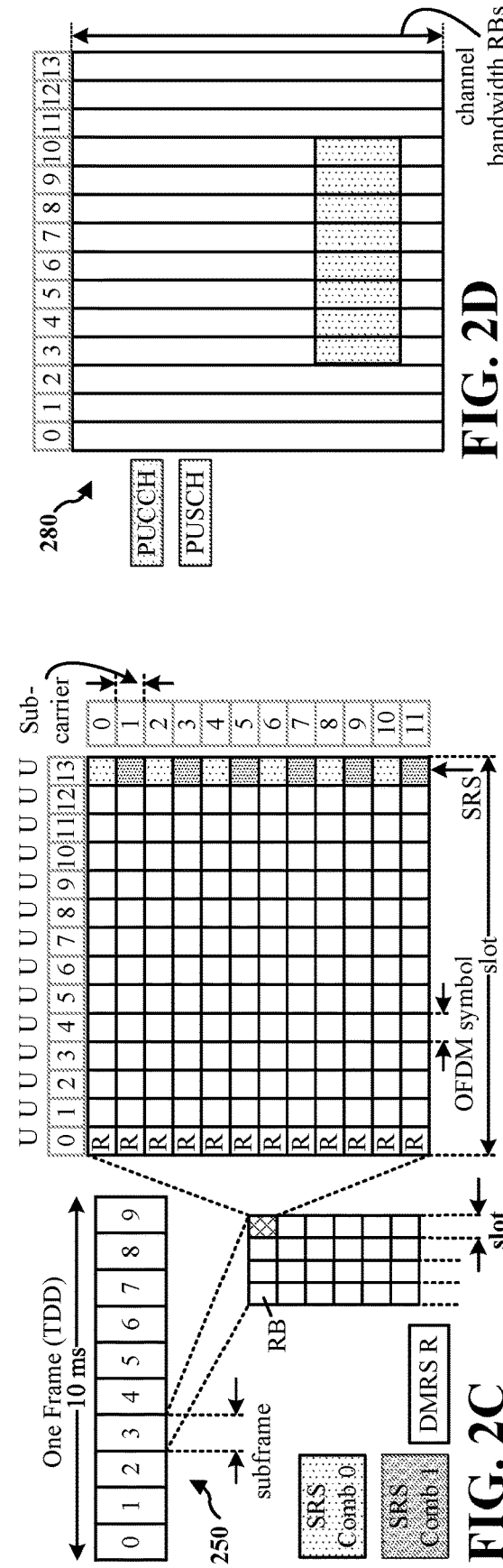

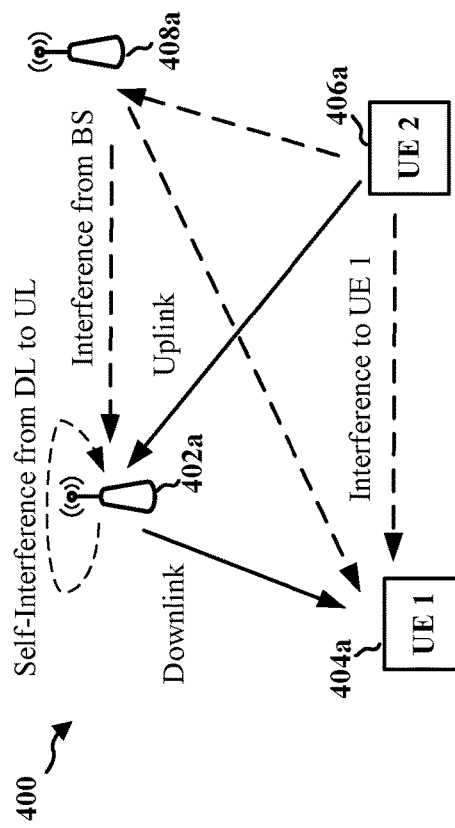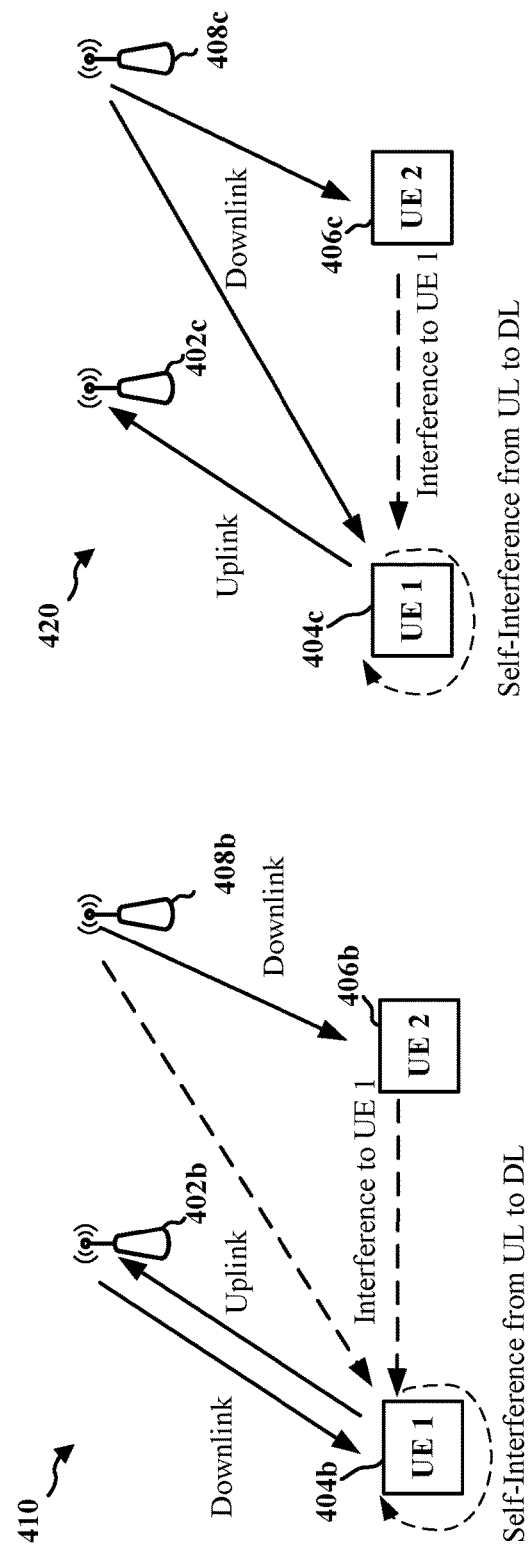

BEAM PAIR INDICATION AND BEAM RESET AFTER BEAM FAILURE RECOVERY

CROSS REFERENCE TO RELATED APPLICATION(S)

This application claims the benefit of and priority to U.S. Provisional Application Ser. No. 63/079,380, entitled "Beam Pair Indication and Beam Reset After Beam Failure Recovery" and filed on Sep. 16, 2020, which is expressly incorporated by reference herein in its entirety.

TECHNICAL FIELD

The present disclosure relates generally to communication systems, and more particularly, to reduced latency recovery from beam failure in full duplex communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The user equipment (UE) apparatus is configured to detect a beam failure for a first beam pair being used for full duplex communication with a base station. The UE is also configured to select a second beam pair for the full duplex communication with the base station and indicating to the base station the second beam pair for full duplex communication. The UE may select the second beam pair before notifying the base station of the beam failure or after notifying the base station of the beam failure. The UE is also configured to apply the second beam pair for the full duplex communication a period of time after indicating the second beam pair to the base station.

In an aspect of the disclosure, a method, a computer-readable medium, and an apparatus are provided. The base station apparatus is configured to receive a beam failure recovery request (BFRQ) from a UE. The BFRQ indicates a beam failure at the UE for at least one beam in a first beam pair being used for full duplex communication at the UE. The base station is also configured to receive an indication of a second beam pair selected by the UE for the full duplex communication at the UE that the UE will apply a period of time after the indication.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIGS. 4A, 4B, and 4C illustrate example diagrams of full duplex wireless communication.

DETAILED DESCRIPTION

Figure 1:
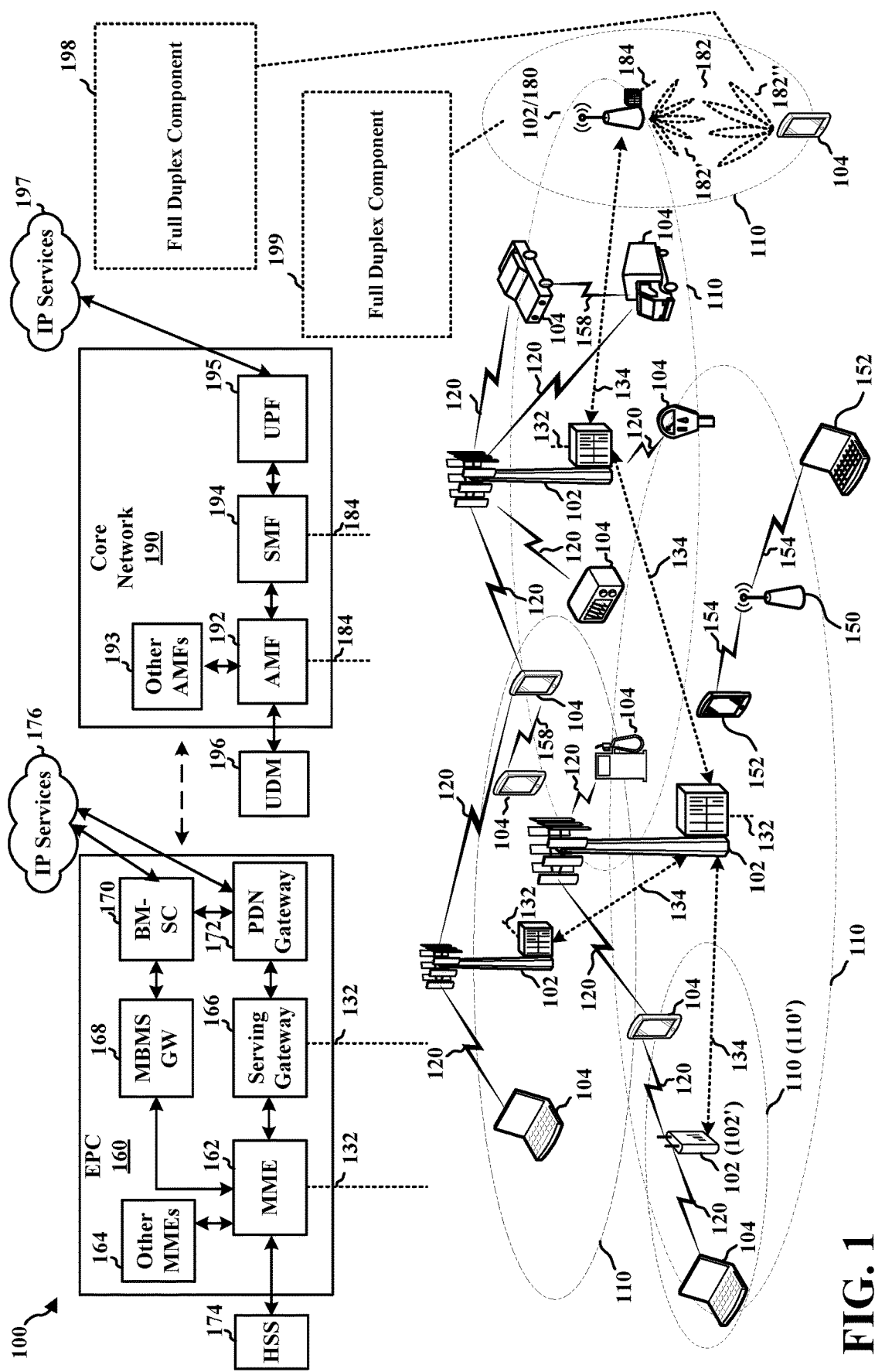
FIG. 1 is a diagram illustrating an example of a wireless communications system and an access network.

A UE and/or a base station may communicate in a full duplex mode in which uplink communication and downlink communication is exchanged in a same frequency band at overlapping times. The UE and the base station may exchange communication using one or more directional beams. A beam between the UE and the base station may become blocked, which may lead to downlink and/or uplink beam degradation leading to a beam failure. A UE or a base station operating in a full duplex mode may experience self-interference for a beam that leads to a beam failure for downlink communication.

When beam failure occurs, it is desirable to reduce latency associated with resetting full duplex communication. Overhead associated with signaling between the UE and base station may increase latency associated with resetting full duplex communication. In one aspect, the UE detects beam failure and immediately selects a new beam pair and indicates the new beam pair to the base station. After detecting a predetermined trigger, for example, a predetermined amount of time or a predetermined number of slots after indicating the new beam pair to the base station, the UE applies the new beam pair to reinstate full duplex communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming (PSS) Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IMS, a PSS Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a full duplex component 198 configured to detect a beam failure in a first beam pair being used for full duplex communication and select a second beam pair and indicate the second beam pair to the base station and apply the second beam pair to reset full duplex communication after a predetermined trigger such as an amount of time or a number of slots after indicating the second beam pair to the base station. In some aspects, the base station 102 or 180 may similarly include a full duplex component 199 configured to receive a beam failure recovery request from a UE indicating a beam failure for a first beam pair being used for full duplex communication with the UE and also receive an indication of a second beam pair selected by the UE to reset full duplex communication after a predetermined trigger such as an amount of time or a number of slots after indicating the second beam pair to the base station. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
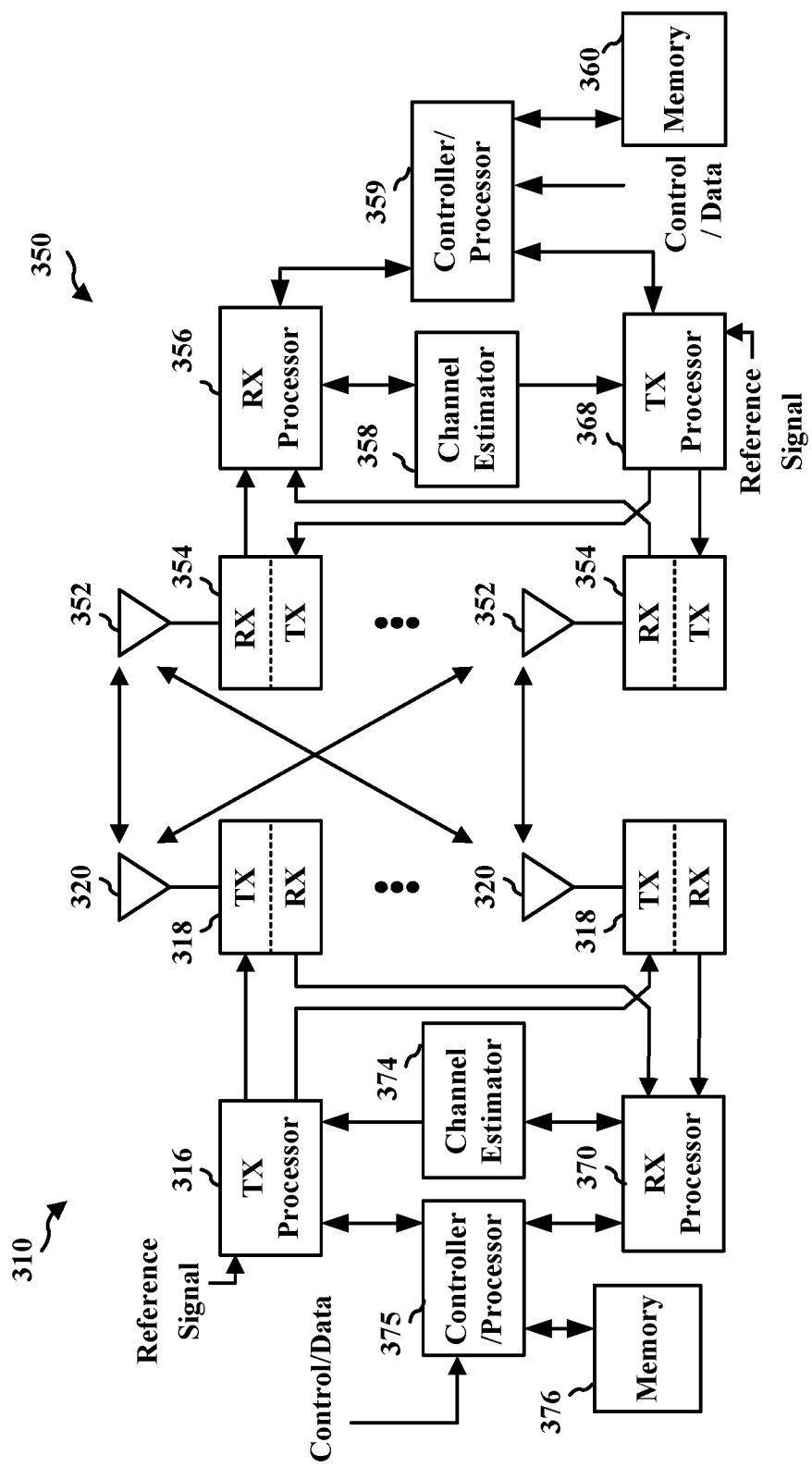
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
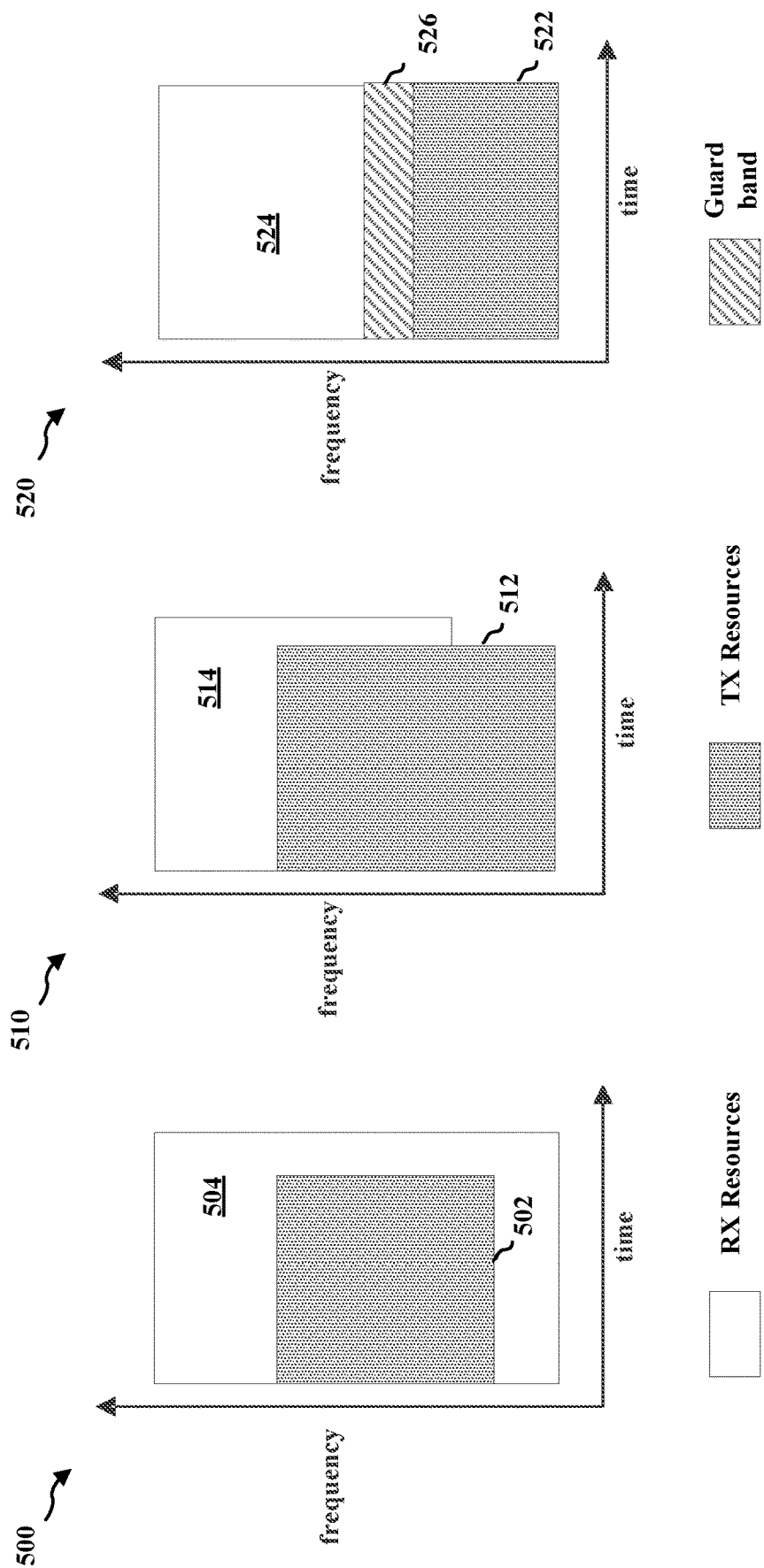
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

As described in connection with FIG. 1, a UE 104 and a base station 102 or 180 may use beamforming 182 to exchange downlink and uplink communication using directional beams. After determination of a beam for communication, conditions may change and may cause a beam to fail. For example, a UE may experience a beam failure if a user moves to a location that blocks the beam to the base station. For example, the UE may move to a different orientation, may move around a corner, or may move to a location in which a building or other structure blocks the beam. In other examples, the surrounding environment may change, e.g., a vehicle may move to a position that blocks the beam between the UE and the base station. If the current beam used by the UE becomes unreliable, the UE may switch to a new beam. The UE may monitor the quality of the beam and may perform radio link monitoring (RLM) in order to detect a reduction in the beam quality.

For example, a UE may monitor a quality of a signal received via reception beam(s). Measurements for RLM, e.g., of downlink signals, may be performed by a physical (PHY) layer of the UE based on one or more RLM reference signals. The PHY layer may pass the RLM measurements to a medium access control (MAC) layer and radio resource control (RRC) layer. The RRC layer may be responsible for detecting a radio link failure (RLF), and the MAC layer may be responsible for detecting beam failures.

The UE may use a Beam Failure Detection (BFD) procedure to identify problems in beam quality and may use a beam failure recovery (BFR) procedure when a beam failure is detected. For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam.

Thresholds may be defined in tracking the radio link conditions, the threshold(s) may correspond to an RSRP, a BLER, etc. that indicates an in-sync condition and/or an out-of-sync condition of the radio link. For example, a threshold, which may be referred to as Qout LR, may be used by the PHY layer to trigger a failure indication to the MAC layer. For example, a beam failure instance may be determined if the monitored RLM reference signal(s) fall below the Qout LR threshold, e.g., if the monitored RLM reference signals fall below Qout LR. The MAC layer may use the indications of the beam failure instances in combination with a count threshold and/or timer to determine a beam failure. For example, the MAC layer may detect compare a number of beam failure instances to a beam failure instance maximum count threshold within a time based on a beam failure detection timer to determine that a beam failure has occurred.

An "out-of-sync" condition may indicate that the radio link condition is poor, and an "in-sync" condition may indicate that the radio link condition is acceptable, and the base station is likely to receive a transmission transmitted on the radio link. An Out-of-Sync condition may be declared when a block error rate for the radio link falls below a threshold over a specified time interval. An in-sync condition may be declared when a block error rate for the radio link is better than a threshold over a specified time interval. If the UE receives a threshold number of consecutive out-of-sync measurements over a period of time, the UE may declare a beam failure.

When a beam failure is detected, a UE may take appropriate actions to recover the connection. For example, after multiple out-of-sync measurements, the UE may transmit a beam failure recovery signal, e.g., a beam failure recovery request (BFRQ) to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

Figure 6:
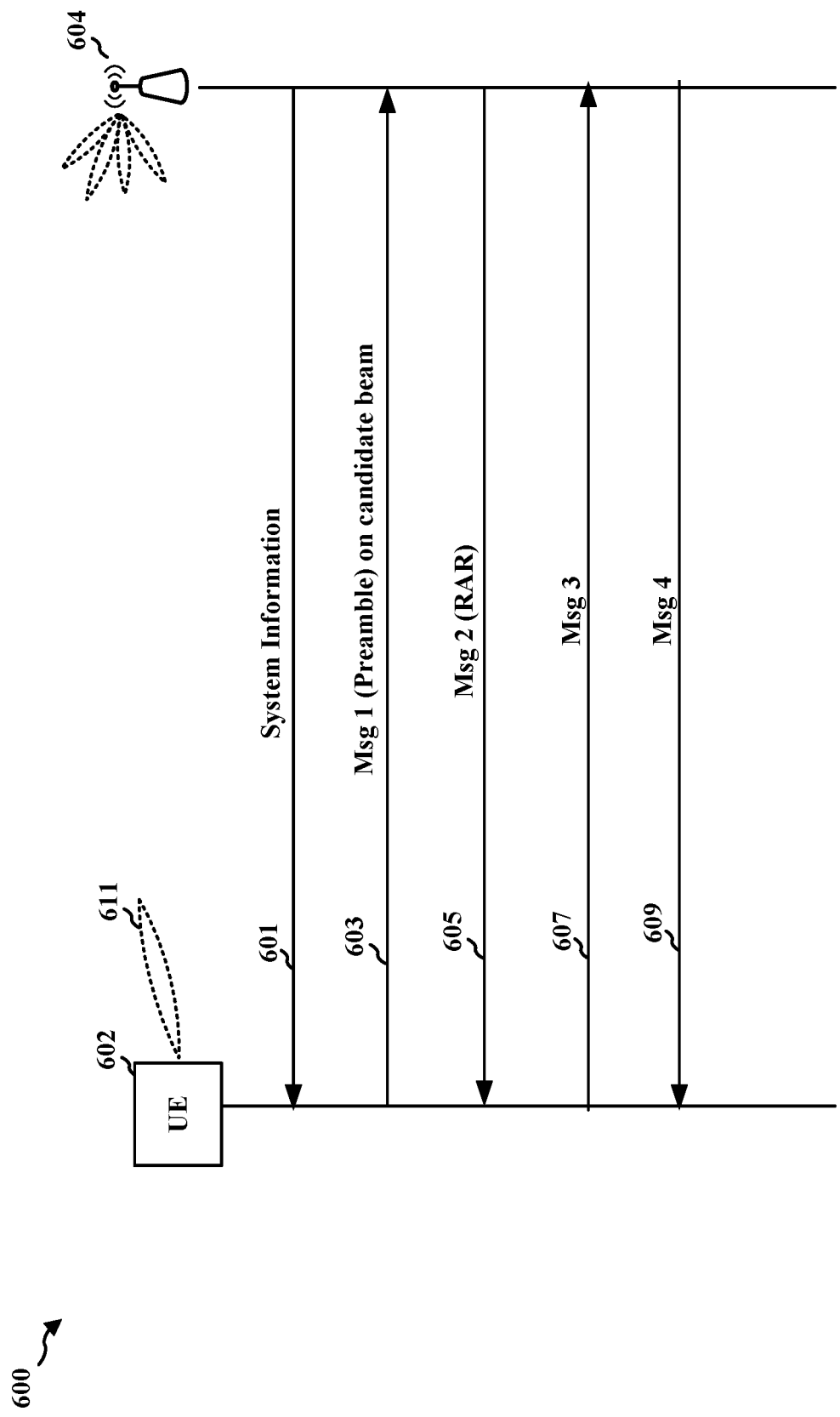
FIG. 6 illustrates an example random access channel (RACH) procedure for beam failure recovery.

The UE may attempt to perform beam failure recovery by initiating a random access procedure (e.g., a contention free random access (CFRA) procedure with a configured beam failure recovery information element (BFR IE)). FIG. 6 illustrates an example beam failure recovery random access channel (RACH) procedure 600 between a UE 602 and a base station 604. Before transmitting a random access preamble in Msg 1 603, the UE may identify a new target beam, e.g., beam 611, for communication with the base station based on RSRP measurements of one or more candidate beams. The UE may use the selected beam 611 to perform the RACH procedure for the beam failure recovery.

A UE may use Contention Based Random Access (CBRA) may be performed when a UE is not synchronized with a base station, and the CFRA may be applied, e.g., as the UE 602 was previously synchronized to a base station 604. Both the procedures include transmission of a random access preamble from the UE to the base station. In CBRA, a UE may randomly select a random access preamble sequence, e.g., from a set of preamble sequences. As the UE randomly selects the preamble sequence, the base station may receive another preamble from a different UE at the same time. Thus, CBRA provides for the base station to resolve such contention among multiple UEs. In CFRA, the network may allocate a preamble sequence to the UE rather than the UE randomly selecting a preamble sequence. This may help to avoid potential collisions with a preamble from another UE using the same sequence. Thus, CFRA is referred to as "contention free" random access.

The UE 602 may initiate the random access message exchange for beam failure recovery by sending, to the base station 604, a first random access message 603 (e.g., Msg 1) including a preamble and an indication that the first random access message 603 is for beam failure recovery using the selected candidate beam 611. Prior to sending the first random access message 603, the UE may obtain random access parameters, e.g., including preamble format parameters, time and frequency resources, parameters for determining root sequences and/or cyclic shifts for a random access preamble, etc., e.g., in system information 601 from the base station 604, in some examples. A RACH procedure based on system information 601 may be referred to as a system information RACH procedure. The preamble may be transmitted with an identifier, such as a Random Access RNTI (RA-RNTI). The UE may monitor for a response from the base station during a random access response window.

The base station responds to the first random access message 603 by sending a second random access message 605 (e.g. Msg 2) using PDCCH and including a random access response (RAR). The RAR may include, e.g., an identifier of the random access preamble sent by the UE, a time advance (TA), an uplink grant for the UE to transmit data, cell radio network temporary identifier (C-RNTI) or another identifier, and/or a back-off indicator. The RACH procedure for beam failure recovery enables the UE and base station to establish communication using a new beam to replace the beam with the detected beam failure.

In some examples, upon receiving the RAR (e.g., 605), the UE 602 may transmit a third random access message 607 (e.g., Msg 3) to the base station 604, e.g., using PUSCH, that may include a RRC connection request, an RRC connection re-establishment request, or an RRC connection resume request, depending on the trigger for the initiating the random access procedure. The base station 604 may then complete the random access procedure by sending a fourth random access message 609 (e.g., Msg 4) to the UE 602, e.g., using PDCCH for scheduling and PDSCH for the message. The fourth random access message 609 may include a random access response message that includes timing advancement information, contention resolution information, and/or RRC connection setup information. The UE 602 may monitor for PDCCH, e.g., with the C-RNTI. If the PDCCH is successfully decoded, the UE 602 may also decode PDSCH. The UE 602 may send HARQ feedback for any data carried in the fourth random access message.

If two UEs transmit a same preamble at 603, e.g., in CBRA, both UEs may receive the RAR leading both UEs to send a third random access message 607. The base station 604 may resolve such a collision by being able to decode the third random access message from only one of the UEs and responding with a fourth random access message to that UE. The other UE, which did not receive the fourth random access message 609, may determine that random access did not succeed and may re-attempt random access. Thus, the fourth message may be referred to as a contention resolution message. The fourth random access message 609 may complete the random access procedure. Thus, the UE 602 may then transmit uplink communication and/or receive downlink communication with the base station 604 based on the RAR (e.g., 605).

Figure 7:
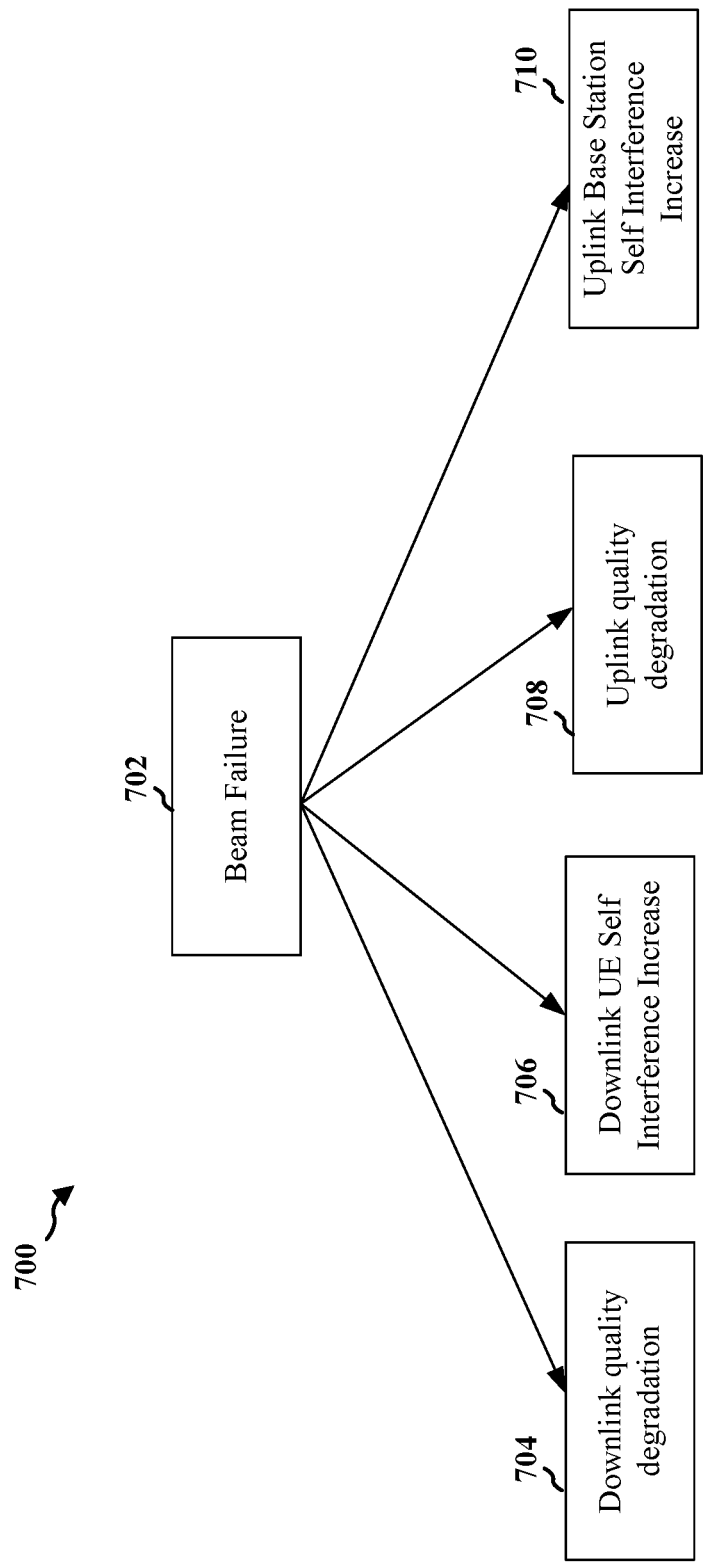
FIG. 7 illustrates examples of categories leading to beam failure.

Beam failure may occur for any of various reasons. FIG. 7 illustrates a diagram 700 of example reasons that may cause a beam failure 702. In some aspects, the beam failure may be based on downlink quality degradation 704 and/or uplink quality degradation 708. As an example, the downlink and/or uplink beam may quality may degrade based on a blocked beam between the UE and the base station. In some aspects, the beam failure 702 may be caused by an increase in self-interference at a UE, as shown at 706. For example, a UE may receive at least a portion of the UE's own uplink transmission, such as the UE 404b in FIG. 4B, that causes an increased amount of self-interference in downlink reception at the UE. In some aspects, the increase in self-interference may be due to a dynamic clutter or a reflecting object in a changing environment of the UE that reflects the uplink transmission back to the UE. In some aspects, the beam failure 702 may be caused by an increase in self-interference at a base station, as shown at 710. For example, a base station, such as the base station 402a in FIG. 4A, may receive at least a portion of the base station's own downlink transmission leading to an increased amount of self-interference in uplink reception at the base station. In some aspects, the increased self-interference at the base station may be due to increased reflection of a downlink signal to the UE 404a that interferes with uplink reception at the base station of the uplink signal from the UE 406a.

Aspects presented herein provide improved detection and signaling relating to beam failure detection due to self-interference, including a beam pair indication and application of the beam pair for full duplex communication with reduced latency. The latency may be reduced through the UE measuring and indicating a selected beam pair for full duplex communication with a base station, e.g., after a BFD. The UE may perform the measurements and send the indication without waiting for an indication from the base station, e.g., independent of an indication from the base station. The UE may directly apply the new beam pair, e.g., resetting the beam pair for full duplex communication, based on a period of time after indicating the new beam pair to the base station. The indication of the new beam pair and the application based on a period of time after the indication enables the UE and the base station to address BFD and communicate using an improved beam pair for full duplex communication with reduced overhead and reduced latency.

Figure 8:
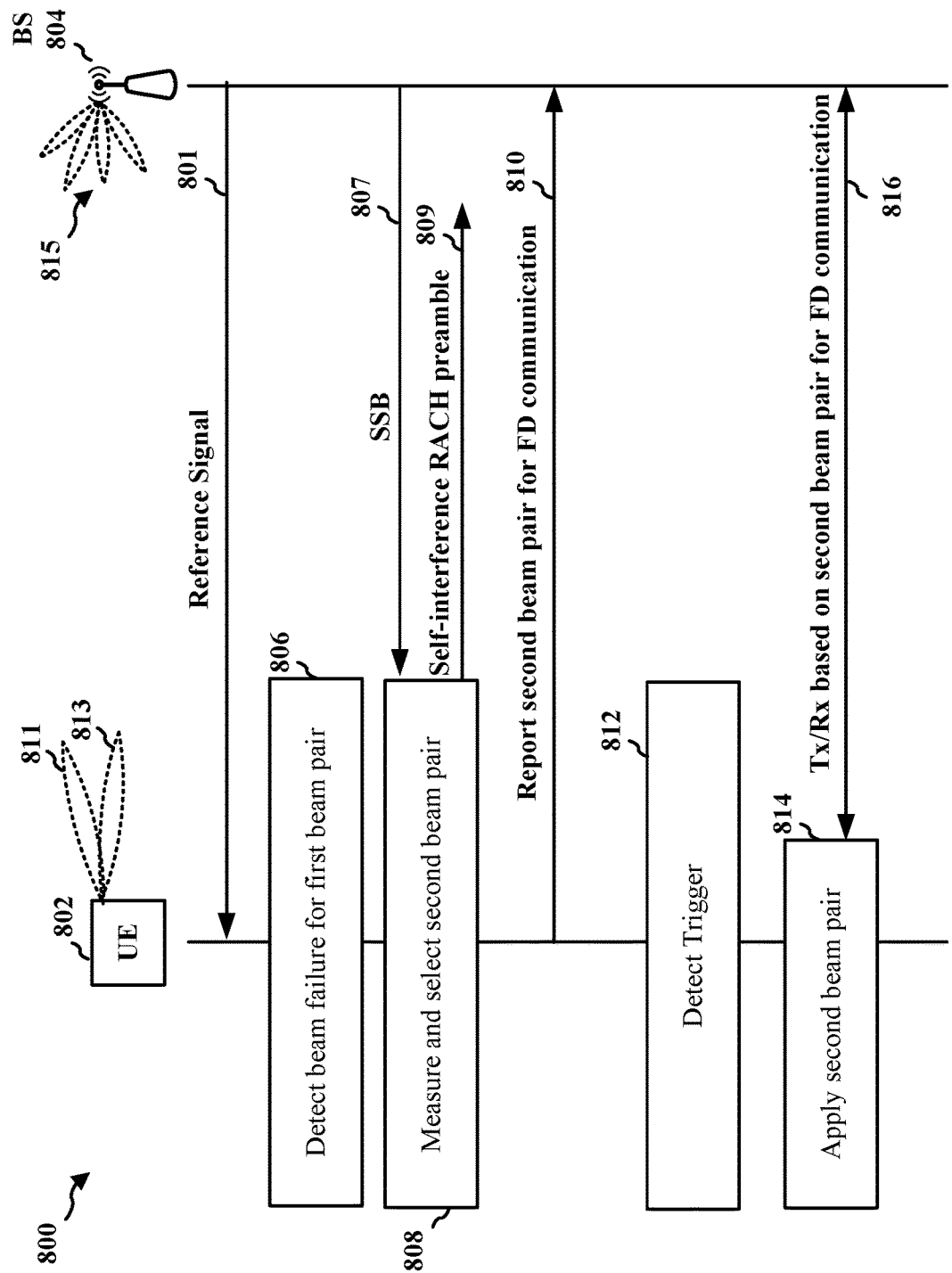
FIG. 8 is an example communication flow between a base station and a UE in accordance with various aspects of the present disclosure.

FIG. 8 is an example communication flow 800 between a base station 804 and a UE 802 in accordance with various aspects of the present disclosure. In the illustrated flow 800, the UE 802 detects a beam failure 806 for a first beam pair being used for full duplex communication between the UE 802 and the base station 804. The BFD may be based on a measurement of one or more reference signals 801, e.g., for RLM or BFD. The UE then selects a second beam pair 808, for example by measuring a set of candidate beams to identify two beams that minimize self-interference. The UE may select the beam pair independent of, e.g., without, an indication from the base station to select a new beam pair (e.g., beams 811 and 813). The UE 802 then indicates 810 to the base station 804 the second beam pair to be used for full duplex communication. Subsequent to detection of a trigger event 812, the UE 802 applies the second beam pair 814 to reset full duplex communication with the base station 804. The UE 802 may transmit and/or receive (e.g., including monitoring for downlink communication) based on the second beam pair for full duplex communication, at 816.

The base station may apply the second beam pair based on a similar trigger in order to transmit and/or receive communication with the UE, at 816. As an example, the UE may indicate the selected beam pair for full-duplex communication and may apply the selected beam pair after a period of time, e.g., such as a number of slots after indicating the new beam pair to the base station or a number of symbols after indicating the new beam pair to the base station. In this example, the trigger may correspond to a period of time elapsing after the UE reports the second beam pair, at 810. As a non-limiting example, the UE may apply the new beam pair 28 symbols after indicating the selected beam pair to the base station or may apply the new beam pair 2 slots after indicating the beam pair to the base station. The communication flow 800 may reduce latency when resetting full duplex communication by reducing signaling overhead between the UE 802 and the base station 804. Thus, the UE may begin performing the beam pair measurements before sending the BFRQ, in some examples.

In some aspects, the UE 802 may perform the new beam measurement and then send the BFRQ to the base station. The UE 802 may measure the new beam pair for full duplex communication via a self-interference RACH. For example, the UE 802 may select SSB beams 1, 3, 5 as good beam candidates based on measurements of the SSB transmission 807 from the base station 804 on the corresponding beams, among beams 815. The UE 802 may the use SSB beam 1 to send the self-interference RACH preamble 809, and then measure self-interference from SSB beam 1 to reception of SSB beam 3 and then SSB beam 5 to select a good DL (SSB1) and UL beam (SSB3 or SSB5) pair among the possible combinations. The then UE repeats the procedure for SSB beam 3 by transmitting the self-interference RACH preamble 809 on SSB beam 3 and measuring the self-interference to SSB reception on SSB beam 1 and SSB beam 5. The UE then repeats the procedure for SSB beam 5 by transmitting the self-interference RACH preamble 809 on SSB beam 5 and measuring the self-interference to SSB reception on SSB beam 1 and SSB beam 3. After the beam sweeps of self-interference measurements, the UE 802 may determine a best new DL and UL beam pair for full-duplex communication and report the new beam pair to the base station, at 810.

If the UE 802 transmits the BFRQ of PCell to the base station 804 via CFRA, the base station 804 may send the BFR response (e.g., Msg2) via DCI scrambled with C-RNTI and may also schedule PUSCH for new beam pair indication UL resource. If the UE 802 is done with the new beam pair measurements, the UE 802 can send an indication of the new beam pair selection via the scheduled PUSCH through a MAC-CE. In some aspects, the base station 804 may transmit a confirmation of the new beam pair indicated by the UE 802. The new beam pair confirmation from the base station 804 may be indicated by PUSCH ACK or by a message of DCI to the UE 802.

If the UE 802 transmits the BFRQ of a PCell to the base station 804 via CBRA, the base station 804 may send the BFR response via DCI scrambled with C-RNTI to the UE 802. If the UE 802 is done with the new beam pair measurements, the UE 802 can send the new beam pair selection indication via PUSCH through MAC-CE in Msg 3. In some aspects, the base station 804 may transmit a confirmation of the new beam pair indicated by the UE 802. The base station 804 may confirm the new beam pair by transmitting a PUSCH ACK or by a message of DCI in Msg 4.

If the UE 802 transmits the BFRQ of a PCell to the base station 804 via its own working UL (e.g., uplink resources of the PCell), e.g., in UCI or PUSCH through a MAC-CE, the base station 804 may send the BFR response via DCI with a UL grant to the UE 802. If the UE 802 is done with new beam pair measurements, the UE 802 may send the new beam pair selection indication to the base station 804 via PUSCH through a MAC-CE on the granted resources. In some aspects, the base station 804 may transmit a confirmation of the new beam pair indicated by the UE 802. The base station 804 may confirm the new beam pair by transmitting a PUSCH ACK or a message of DCI to the UE 802.

If the UE 802 transmits the BFRQ of SCell to the base station 804 via PUSCH through a MAC-CE of the PCell or another SCell (e.g., an SCell whose beam(s) have not failed) based on the SR's UL grant, the base station 804 may send the BFR response via DCI to the UE 802. If the UE 802 is done with new beam pair measurements of the SCell, the UE 802 may send the new beam pair selection indication to the base station 804 via PUSCH through a MAC-CE of the PCell or another SCell. The base station 804 may confirm the new beam pair by transmitting PUSCH ACK or by a message of DCI of PCell or another SCell to the UE 802.

Figure 9:
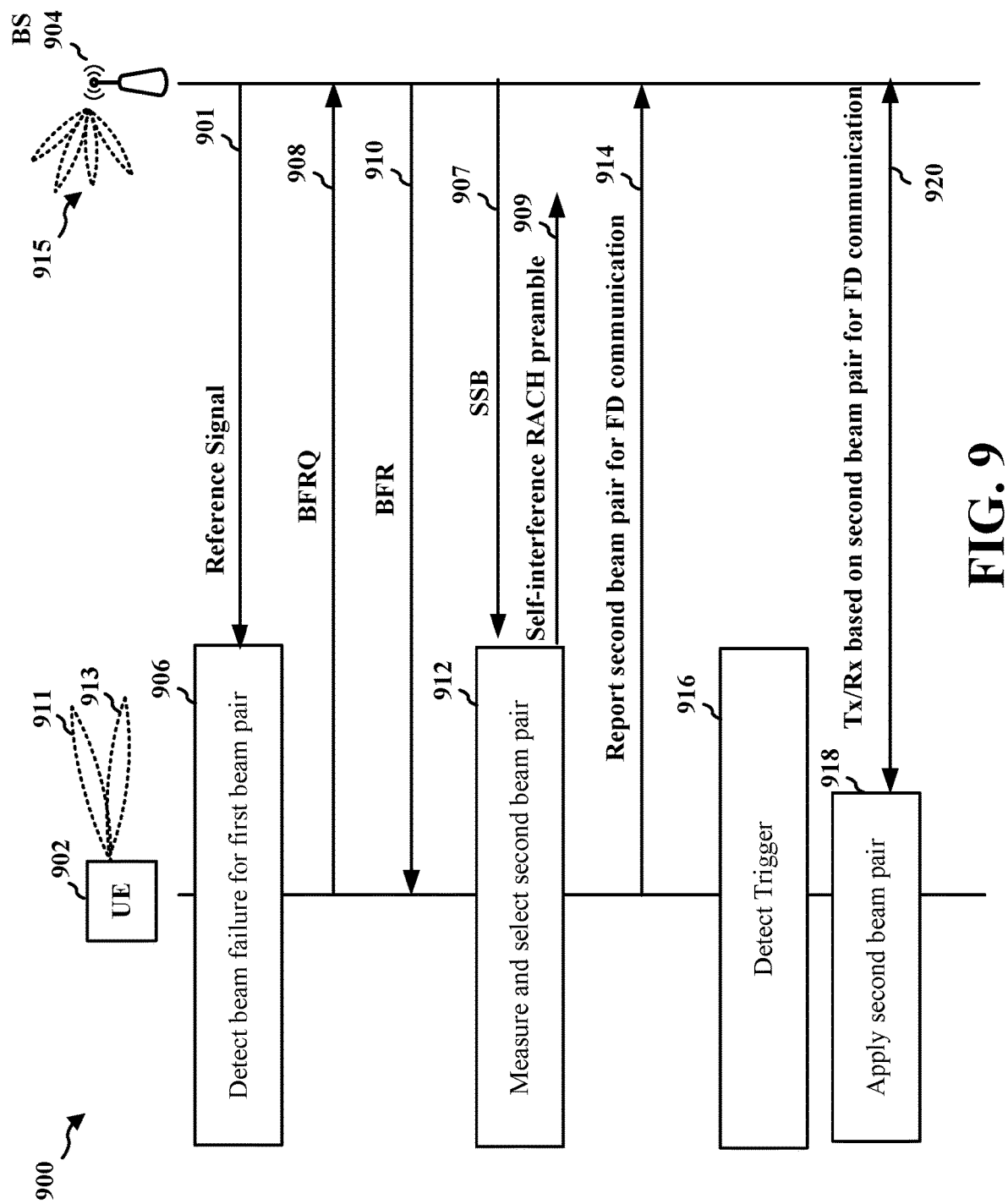
FIG. 9 is an example communication flow between a base station and a UE in accordance with various aspects of the present disclosure.

In some aspects, the UE may transmit a BFRQ first and then perform measurements to determine a new beam pair for full duplex communication. FIG. 9 is an example communication flow 900 between a base station 904 and a UE 902 in accordance with various aspects of the present disclosure. In the illustrated flow 900, the UE 902 detects a beam failure 906 for a first beam pair being used for full duplex communication between the UE 902 and the base station 904. The BFD may be based on a measurement of one or more reference signals 901, e.g., for RLM or BFD. The UE then sends a beam failure recovery request (BFRQ) 908 to the base station 904 and the base station responds with a beam failure response (BFR) 910. The BFR 910 may grant resources to the base station and/or identify candidate beam pairs for measurement. The UE 902 then selects a second beam pair 912, for example by measuring a set of candidate beams to identify two beams that minimize self-interference. As described in the example in FIG. 8, the UE 902 may measure the new beam pair for full duplex communication via a self-interference RACH. For example, the UE 902 may select one or more SSB beams as good beam candidates based on measurements of the SSB transmission 907 from the base station 904 on a set of beams 915. The UE 902 may the one or more SSB beam to send a self-interference RACH preamble 909, and then measure self-interference from the RACH preamble 909 on the SSB beam to reception of one or more other SSB beams. The UE 902 may perform the measurement for possible combination of transmission and reception beams, e.g., in a round robin or beam sweep manner as described in connection with FIG. 8.

The UE 902 then indicates 914 to the base station 904 the second beam pair (e.g., beams 911 and 913) to be used for full duplex communication. The UE 902 may transmit a report or other indication of the second beam pair for full duplex communication to the base station 904. Similar to the description in connection with FIG. 8, the UE may apply the selected beam pair, at 918, after a period of time following the indication to the base station 904, e.g., a number of slots after indicating the new beam pair to the base station or a number of symbols after indicating the new beam pair to the base station. Subsequent to detection of a predetermined trigger 916, the UE 902 applies the second beam pair to reset full duplex communication 920 with the base station 904. The communication flow 900 may reduce latency when resetting full duplex communication by optimizing signaling overhead between the UE 902 and the base station 904.

If the UE 902 transmits the BFRQ of the PCell to the base station 904 via CFRA, the base station 904 may send the BFR response in a Msg2 via DCI scrambled with C-RNTI. Then, the UE 902 may perform the new beam pair measurements based on SRS resources configured by the base station 904 or via self-interference RACH. After performing the measurements, the UE 902 may send the new beam pair selection report/indication to the base station 904 via PUSCH through MAC-CE. The base station 904 may confirm the new beam pair by sending a PUSCH ACK or by a message of DCI to the UE 902.

If the UE 902 transmits the BFRQ of PCell to the base station 904 via CBRA (RACH Msg 3), the base station 904 may send the BFR response via DCI scrambled with C-RNTI via Msg 4. Then, the UE 902 may perform the new beam pair measurements based on SRS resources configured by the base station or via self-interference RACH. After that, the UE 902 may send the beam pair selection report/indication via PUSCH through MAC-CE. The base station 904 may confirm the new beam pair by sending PUSCH ACK or by a message of DCI to the UE 902.

If the UE 902 transmits the BFRQ of SCell to the base station 904 via its own working UL beam, e.g., in UCI or PUSCH through MAC-CE, the base station 904 may send the BFR response via DCI and may include a UL grant to the UE 902. Then, the UE 902 may perform the new beam pair measurements based on SRS resources configured by the base station or via self-interference RACH. After that, the UE 902 may send the new beam pair selection report/indication via PUSCH through MAC-CE to the base station 904 and may send on the granted resources. The base station 904 may confirm the new beam pair by sending PUSCH ACK or by a message of DCI to the UE 902.

If the UE 902 transmits the BFRQ of the SCell to the base station 904 via PUSCH through MAC-CE of PCell or another SCell (e.g., an SCell having an uplink beam that has not failed) base on the SR's UL grant, the base station 904 may send the BFR response via DCI to the UE 902. Then, the UE 902 may perform the new beam pair measurements based on SRS resources configured by the base station 904 or via self-interference RACH of SCell. After that, the UE 902 may send the new beam pair selection report/indication to the base station 904 via PUSCH through MAC-CE of PCell or another SCell. The base station 904 may confirm the new beam pair by sending PUSCH ACK or by a message of DCI of PCell or another SCell to the UE 902.

FIGS. 10-15 are flowcharts of methods of wireless communication in accordance with various aspects of the present disclosure.

Figure 10B:
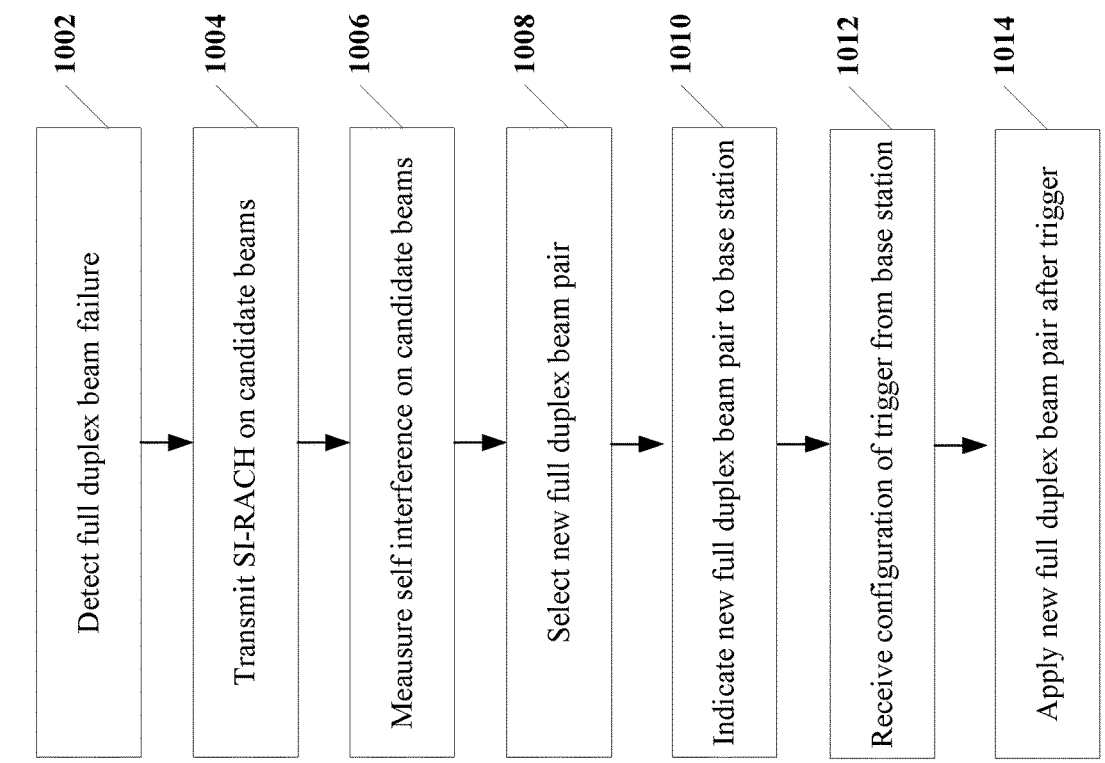
FIGS. 10A, 10B, and 11-15 are flowcharts of methods of wireless communication in accordance with various aspects of the present disclosure.
Figure 10A:
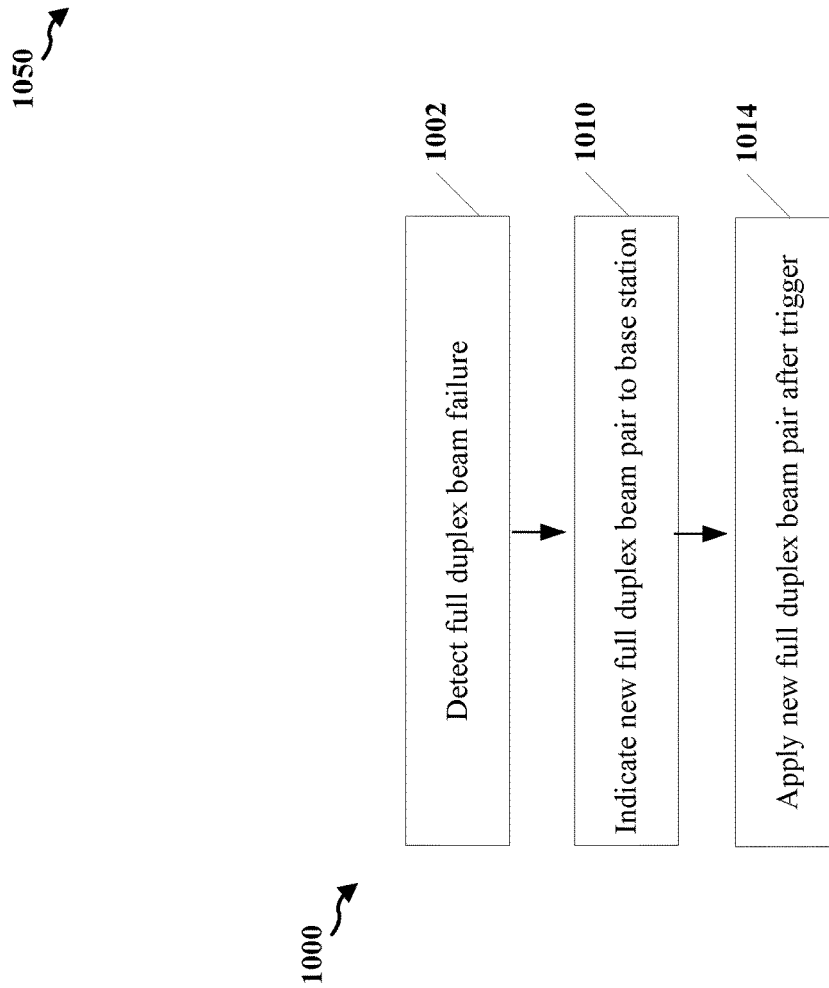

FIG. 10A is a flowchart of a method 1000 of wireless communication. The method may be performed by a UE (e.g., the UE 104, 350, 404a-c, 602, 802, 902; the apparatus 1602). In some aspects, the method may be performed by the apparatus 1602 in FIG. 16, which includes memory and at least one processor, the apparatus including one or more components configured to perform the aspects of the method 1000. The method may help to reduce latency for a full-duplex beam pair reset and may improve full duplex communication for the UE.

At 1002, the UE detects a beam failure for full duplex communication with the base station. For example, 1002 may be performed by the beam measurement component 1640 of the apparatus 1602 in FIG. 16. The beam failure detection may be based on any of the aspects described in connection with FIG. 7, for example. FIG. 8 and FIG. 9 illustrate additional examples of a UE detecting a beam failure in full duplex communication. FIGS. 4A-C and 5 illustrate examples aspects of full duplex communication.

At 1010, the UE indicates to the base station a second beam pair for full duplex communication with the base station. This may be done by transmitting a BFRQ to the base station that indicates the new beam pair and may also be performed by the beam pair component 1642 of the apparatus 1602 in FIG. 16. FIG. 8 illustrates an example in which the UE may measure and identify the new beam pair for full duplex communication before transmitting a BFRQ. FIG. 9 illustrates an example in which the UE may measure and identify the new beam pair for full duplex communication after transmitting a BFRQ to the base station.

At 1014, the UE applies the second full duplex beam pair for full duplex communication a period of time after indicating the second full duplex beam pair to the base station. The application in 1014 may also be performed by the beam pair component 1642 of the apparatus 1602 in FIG. 16. FIG. 8 and FIG. 9 illustrate example aspects of a UE applying a new beam pair for full duplex communication. In some aspects, a trigger for indicating the new beam pair for full duplex communication may include the passing of an amount of time or a predetermined number of slots after indicating the new beam pair to the base station. The amount of time may be predetermined. The amount of time may be defined or may be based on a configuration from the base station. For example, the UE may use the new full duplex beam pair to transmit and receive communication in a full duplex mode, e.g., as described in connection with FIGS. 8 and/or 9.

FIG. 10B is a flowchart of a method 1050 of wireless communication. The method may be performed by a UE (e.g., the UE 104, 350, 404a-c, 602, 802, 902; the apparatus 1602). In some aspects, the method may be performed by the apparatus 1602 in FIG. 16, which includes memory and at least one processor, the apparatus including one or more components configured to perform the aspects of the method 1000. The method 1050 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

In some aspects, at 1004 and 1006, the UE may conduct a round-robin measurement of each beam in a set of candidates beams. Example aspects of measurement are described in connection with FIG. 8 and FIG. 9. In an aspect, 1004 and 1006 may also be performed by the beam measurement component 1640 of the apparatus 1602 in FIG. 16.

For example, at 1004 the UE may transmit a self-interference random access channel (RACH) preamble on each beam in a set of candidate beams and at 1006 the UE may receive the transmitted preamble on each non-transmitting beam and measure self-interference. The UE may perform the transmission and measurement for a set of SSB beam candidates. As an example, if the SSB candidates are SSB beam 1, SSB beam 3, and SSB beam 5, the UE may transmit a system information RACH preamble on SSB beam 1 and may measure the self-interference from the preamble transmission on SSB 3. The UE may then transmit the system information RACH preamble on SSB beam 1 and may measure the self-interference from the preamble transmission on SSB 5. The UE may then transmit the system information RACH preamble on SSB beam 3 and may measure the self-interference from the preamble transmission on SSB 5. The UE may then transmit the system information RACH preamble on SSB beam 3 and may measure the self-interference from the preamble transmission on SSB 1. The UE may then transmit the system information RACH preamble on SSB beam 5 and may measure the self-interference from the preamble transmission on SSB 1. The UE may then transmit the system information RACH preamble on SSB beam 5 and may measure the self-interference from the preamble transmission on SSB 1. Thus, the UE may beam sweep the system information RACH preamble on the candidate beams. Thus, the UE may measure self-interference for each possible combination of the candidate beams in order to determine the beam pair having the best downlink beam and uplink beam for full-duplex communication, e.g., having a lowest level of measured self-interference. The transmission of the system information RACH preamble may be intended for measurement purposes and not to receive a response (e.g., RAR) from the base station. If the UE receive an RAR response from the base station for one or more of the preamble transmissions, the UE may ignore the RAR, e.g., until the UE selects a beam pair.

At 1008, the UE may select a new full duplex beam pair, for example based on the beam pair that minimizes self-interference. In an aspect, 1008 may be performed by the beam pair component 1642 of the apparatus 1602 in FIG. 16.

Figure 16:
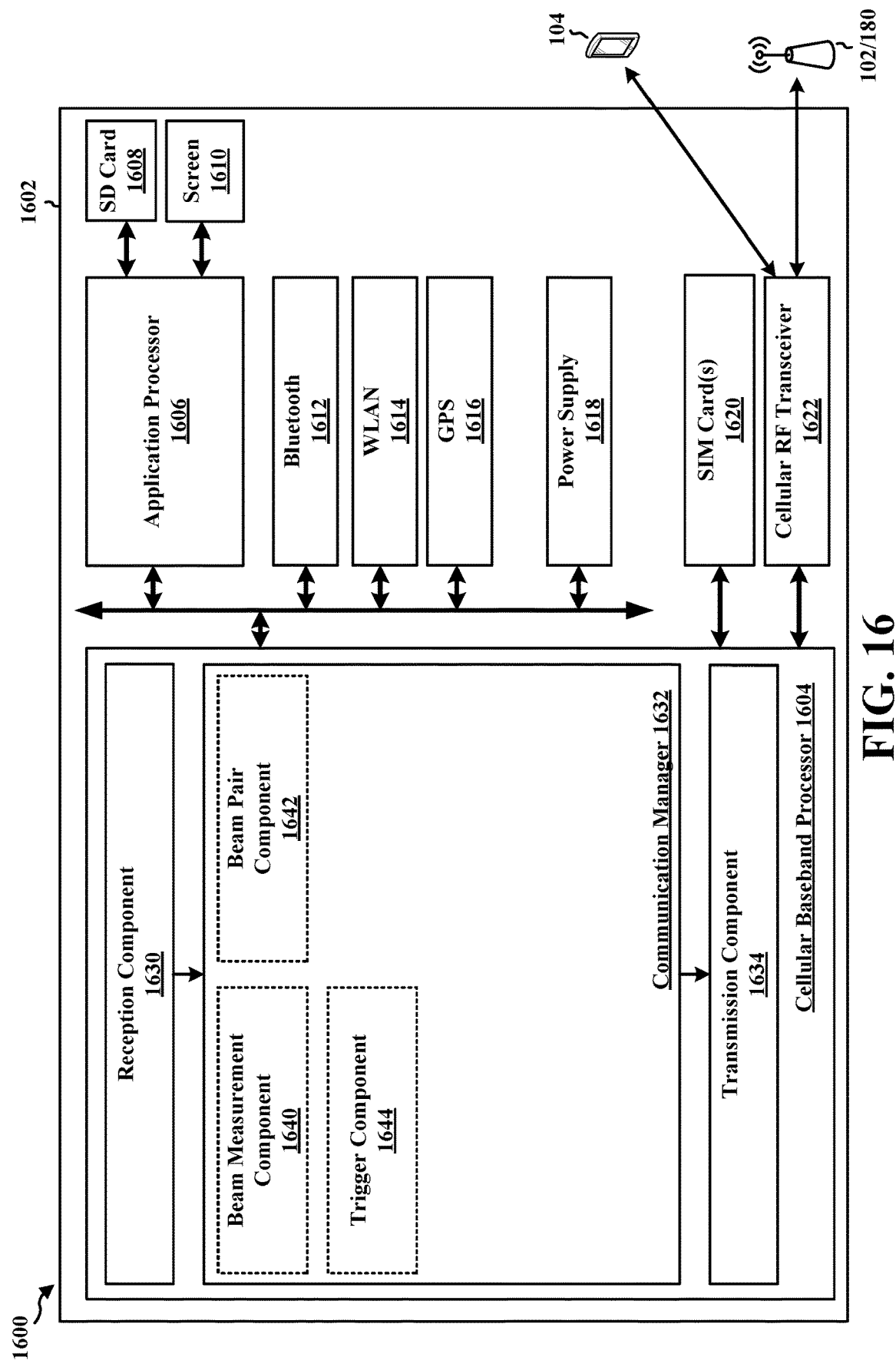
FIG. 16 is a diagram illustrating an example of a hardware implementation for an example UE apparatus.
Figure 17:
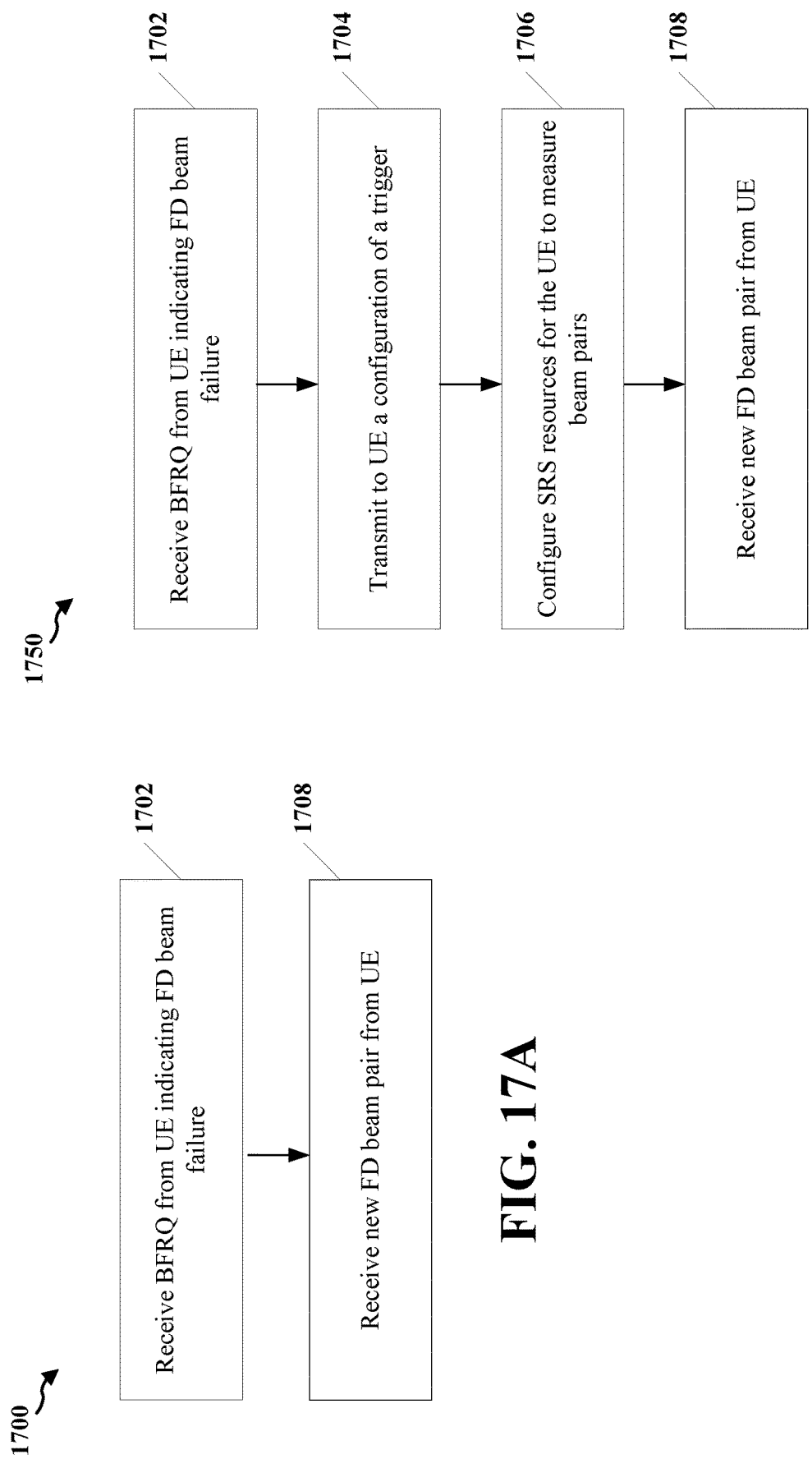
FIGS. 17A, 17B, and 18-21 are flowcharts of methods of wireless communication in accordance with various aspects of the present disclosure.

In some aspects, at 1012 the UE may receive from the base station a configuration of a trigger, which may be performed by the trigger component 1644 of the apparatus 1602 in FIG. 16.

Figure 11:
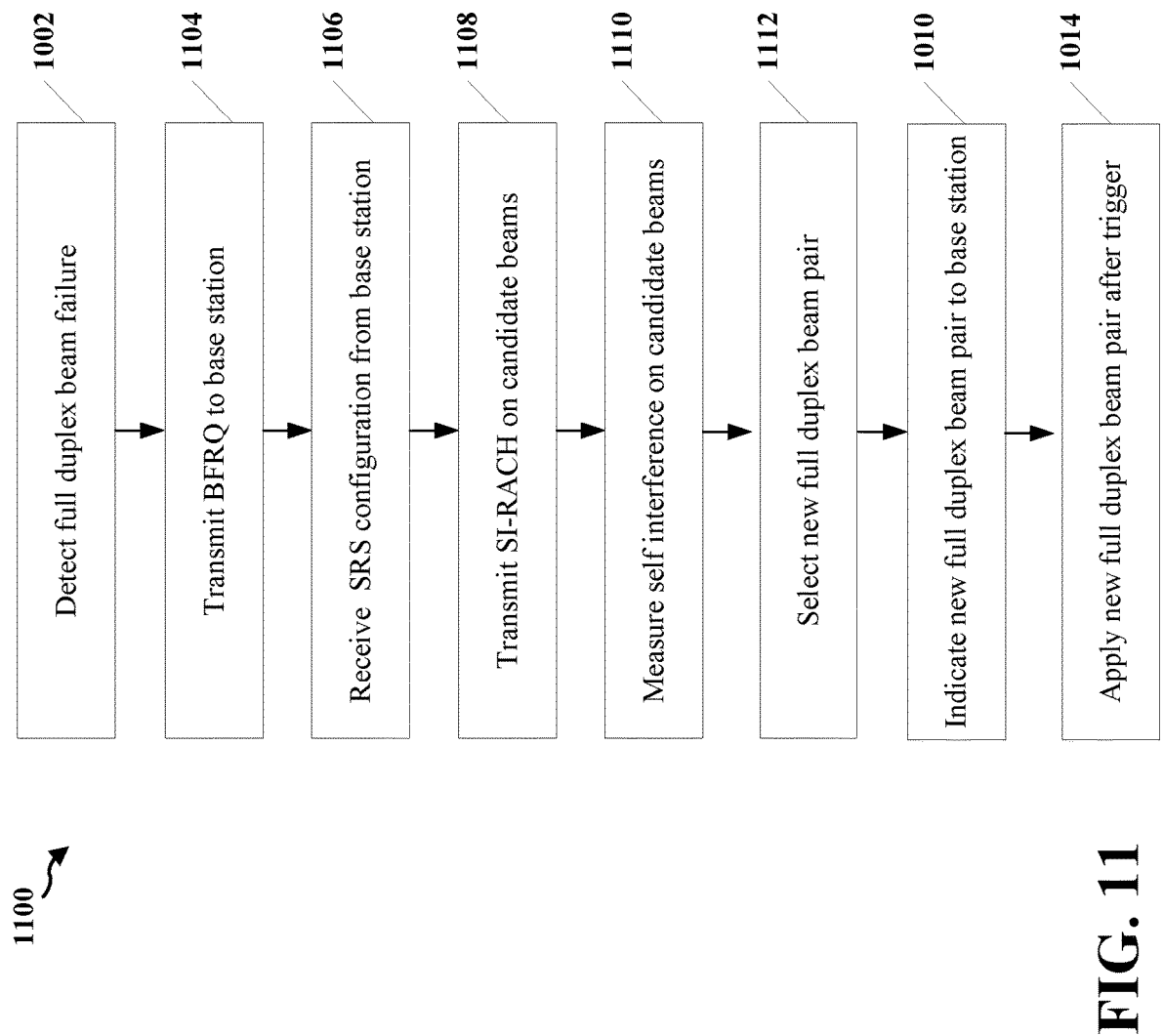

FIG. 11 is a flowchart of a method 1100 of wireless communication. The method may be performed by a UE (e.g., the UE 104; the apparatus 1602). In some aspects, the method may be performed by the apparatus 1602 in FIG. 16, which includes memory and at least one processor, the apparatus including one or more components configured to perform the aspects of the method 1100. The method 1100 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

At 1002, the UE detects a beam failure in full duplex communication with the base station, e.g., as described in connection with FIG. 10A. For example, 1002 may be performed by the beam measurement component 1640 of the apparatus 1602 in FIG. 16.

At 1104 the UE may transmit a beam failure recovery request to the base station. FIG. 9 illustrates example aspects of a UE transmitting a BFRQ before measuring and identifying a new beam pair for full duplex communication. The transmission of the BFRQ at 1104 may be performed by the beam measurement component 1640 of the apparatus 1602 in FIG. 16.

In some aspects, at 1106 the UE may receive a configuration of a sounding reference signal (SRS) from the base station in response to the BFRQ. The SRS may identify a set of candidate beams for the UE to measure in order to select a new beam pair for full duplex communication. and the reception of the SRS configuration at 1106 may be performed by the beam measurement component 1640 of the apparatus 1602 in FIG. 16.

At 1108 and 1110, after the transmitting the BFRQ, the UE may conduct a round-robin measurement of each beam in a set of candidates beams, for example the set of candidate beams identified in the SRS, where the UE measures self-interference for a set of candidate beam pairs based on transmissions in the SRS resources. FIG. 9 illustrates example aspects of a measurement, at 912. In an aspect, 1108 and 1110 may also be performed by the beam measurement component 1640 of the apparatus 1602 in FIG. 16. For example, at 1108 the UE may transmit a self-interference RACH preamble on each beam in the set of candidate beams and at 1110 the UE may receive the transmitted preamble on each non-transmitting beam and measure self-interference that the transmission of the preamble causes to downlink reception.

At 1112, the UE may select a new full duplex beam pair, for example based on the beam pair that minimizes self-interference. In an aspect, 1112 may be performed by the beam pair component 1642 of the apparatus 1602 in FIG. 16.

At 1010, the UE indicates to the base station the new full duplex beam pair. The indication at 1010 may be performed by transmitting a BFRQ to the base station that indicates the new beam pair and may also be performed by the beam pair component 1642 of the apparatus 1602 in FIG. 16.

At 1014, the UE then applies the new full duplex beam pair to reset full duplex communication after determining that a trigger has occurred. The application at 1014 may also be performed by the beam pair component 1642 from FIG. 16. In one aspect, the trigger may be the passing of a predetermined amount of time or a predetermined number of slots after indicating the new beam pair to the base station. For example, the UE may use the new full duplex beam pair to transmit and receive communication in a full duplex mode, e.g., as described in connection with FIG. 9.

Figure 12:

FIG. 12 is a flowchart of a method 1200 of wireless communication. The method may be performed by a UE (e.g., the UE 104; the apparatus 1602). In some aspects, the method may be performed by the apparatus 1602 in FIG. 16, which includes memory and at least one processor, the apparatus including one or more components configured to perform the aspects of the method 1200. The method 1200 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

At 1002, the UE detects a beam failure in full duplex communication with the base station. For example, 1202 may be performed by the beam measurement component 1640.

At 1204 the UE may transmit a BFRQ to the base station. The UE may transmit the BFRQ to the base station in a CFRA message or a CBRA message. Other messages may also be employed. At 1206, the UE receives the BFR from the base station. In one aspect, the BFR may be received from the base station in a RAR. 1204 and 1206 may be performed by the beam measurement component 1640.

At 1208, the UE selects a new full duplex beam pair, for example based on the beam pair that minimizes self-interference. In an aspect, 1208 may be performed by the beam pair component 1642 from FIG. 16. Next, at 1010 the UE indicates to the base station the new full duplex beam pair. This may be accomplished by transmitting a MAC-CE on a PUSCH resource, where the MAC-CE includes an indication of the second beam pair for the full duplex communication. This may also be accomplished by transmitting a MAC-CE in a random access message, where the MAC-CE includes an indication of the second beam pair for the full duplex communication. In an aspect, 1208 and 1010 may also be performed by the beam pair component 1642 from FIG. 16.

At 1012, the UE applies the new full duplex beam pair to reset full duplex communication after determining that a trigger has occurred. The application at 1012 may be performed by the beam pair component 1642 from FIG. 16. In one aspect, the trigger may be the passing of a predetermined amount of time or a predetermined number of slots after indicating the new beam pair to the base station. At 1214, the UE may receive confirmation of the new beam pair from the base station. 1214 may be performed by the beam pair component 1642 from FIG. 16. For example, the confirmation may be received via a MAC-CE ACK message, in DCI or in a random access message.

Figure 13:
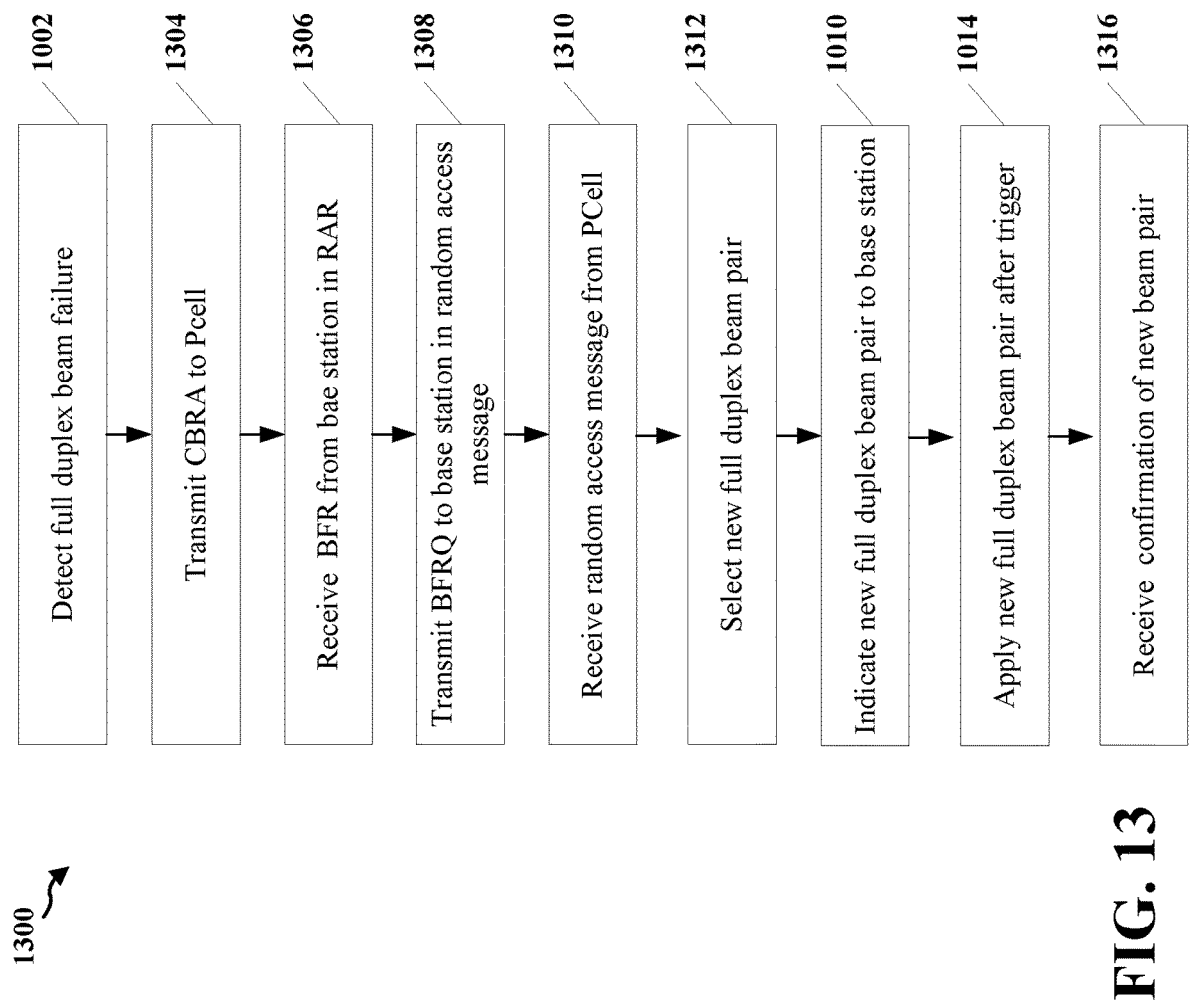

FIG. 13 is a flowchart of a method 1300 of wireless communication. The method may be performed by a UE (e.g., the UE 104; the apparatus 1602). In some aspects, the method may be performed by the apparatus 1602 in FIG. 16, which includes memory and at least one processor, the apparatus including one or more components configured to perform the aspects of the method 1300. The method 1300 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

At 1002, the UE detects a beam failure in full duplex communication with the base station. For example, 1002 may be performed, e.g., by the beam measurement component 1640 of the apparatus 1602 in FIG. 16.

At 1304 the UE may transmit a CBRA message to a PCell, and at 1306 the UE may receive a BFR in a random access message including a RAR from the PCell. At 1308 the UE may transmit a BFRQ to the PCell. In one aspect, the UE may transmit the BFRQ to the PCell in a random access message. At 1310, the UE may receive a random access message from the PCell. In one aspect, any of 1304, 1306, 1308, and 1310 may be performed, e.g., by the beam measurement component 1640 of the apparatus 1602 in FIG. 16.

At 1312, the UE may select a new full duplex beam pair, for example based on the beam pair that minimizes self-interference. Next, at 1010, the UE indicates to the base station the new full duplex beam pair. This may be done by transmitting a MAC-CE that indicates the new beam pair. At 1014, the UE then applies the new full duplex beam pair to reset full duplex communication after determining that a trigger has occurred. For example, the trigger may be the passing of a predetermined amount of time or a predetermined number of slots after indicating the new beam pair to the base station. Any of 1010, 1014 and 1316 may be performed, e.g., by the beam pair component 1642 of the apparatus 1602 in FIG. 16.

At 1318, the UE may receive confirmation of the new beam pair from the base station. 1318 may be performed, e.g., by the beam pair component 1642 of the apparatus 1602 in FIG. 16. For example, the confirmation may be received via a MAC-CE ACK message or in DCI.

Figure 14:
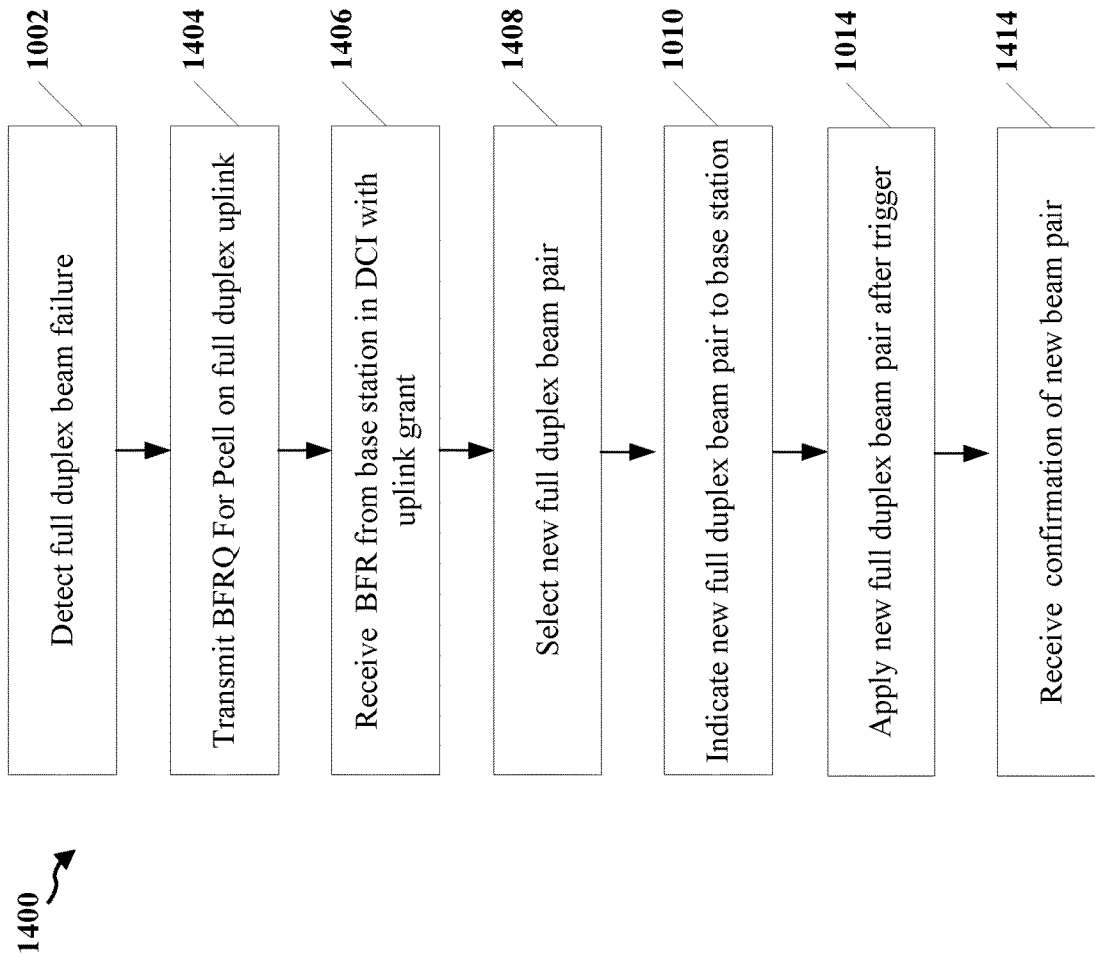

FIG. 14 is a flowchart of a method 1400 of wireless communication. The method may be performed by a UE (e.g., the UE 104; the apparatus 1602). In some aspects, the method may be performed by the apparatus 1602 in FIG. 16, which includes memory and at least one processor, the apparatus including one or more components configured to perform the aspects of the method 1400. The method 1400 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

At 1002, the UE detects a beam failure for a beam pair being used in full duplex communication with the base station. For example, 1002 may be performed by the beam measurement component 1640 of the apparatus 1602 in FIG. 16.

At 1404 the UE may transmit a BFRQ for a PCell on an uplink beam of the beam pair being used in full duplex communication with the base station. In one aspect, the UE may transmit the BFRQ in an UCI on a PUCCH or in a MAC-CE on the PUSCH. At 1406 the UE may receive a BFR in downlink control information with an uplink grant. In one aspect, 1404 and 1406 may be performed by the beam pair component 1642 of the apparatus 1602 in FIG. 16.

Next, at 1408, the UE selects a new full duplex beam pair, for example based on the beam pair that minimizes self-interference. Next, at 1010 the UE indicates to the base station the new full duplex beam pair. This may be done by transmitting a MAC-CE that indicates the new beam pair. For example, the MAC-CE may be transmitted on a PUSCH based on the uplink grant. In one aspect, 1408 and 1010 may be performed by the beam pair component 1642 of the apparatus 1602 in FIG. 16.

At 1014, the UE then applies the new full duplex beam pair to reset full duplex communication after determining that a trigger has occurred. For example, the trigger may be the passing of a predetermined amount of time or a predetermined number of slots after indicating the new beam pair to the base station. In one aspect, 1014 may be performed by the beam pair component 1642 of the apparatus 1602 in FIG. 16.

At 1414, the UE may receive confirmation of the new beam pair from the base station. 1414 may be performed by the beam pair component 1642 of the apparatus 1602 in FIG. 16. For example, the confirmation may be received via a MAC-CE ACK message or in DCI.

Figure 15:
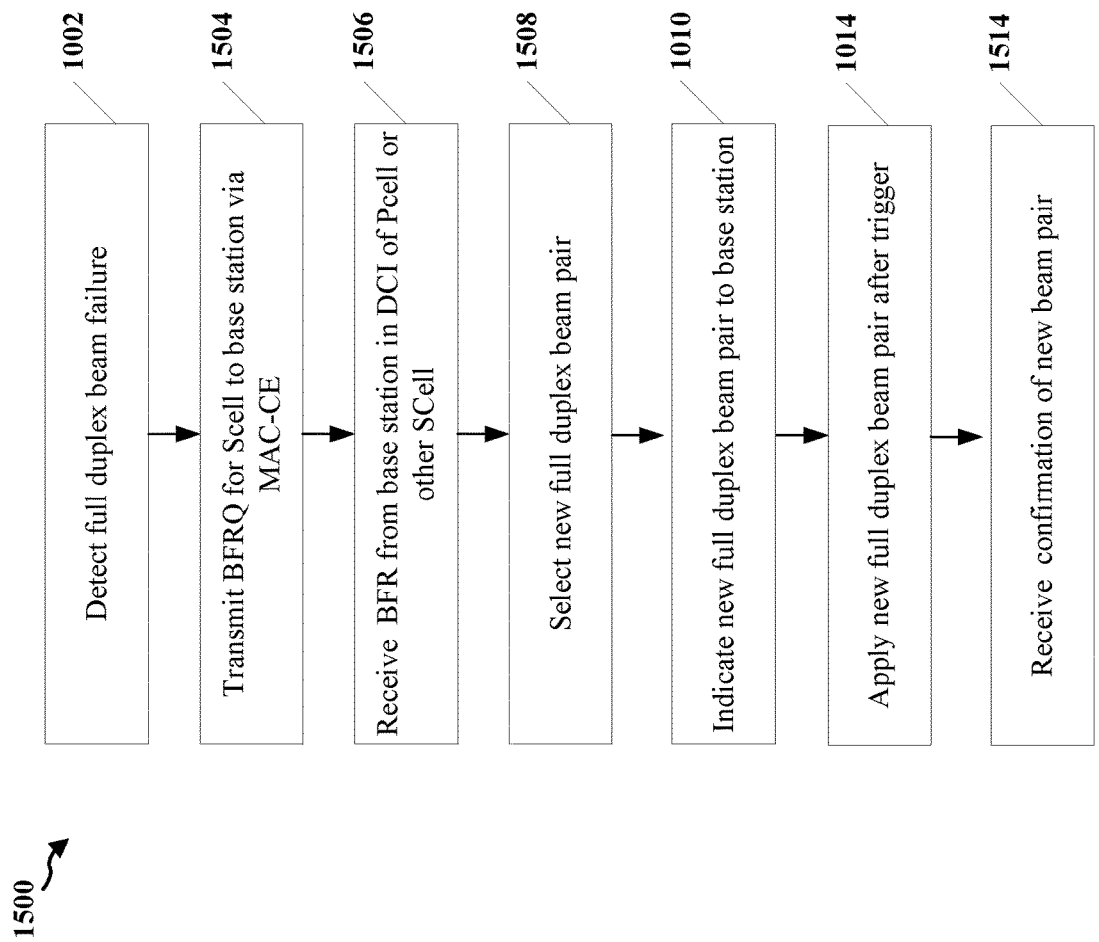

FIG. 15 is a flowchart of a method 1500 of wireless communication. The method may be performed by a UE (e.g., the UE 104; the apparatus 1602). In some aspects, the method may be performed by the apparatus 1602 in FIG. 16, which includes memory and at least one processor, the apparatus including one or more components configured to perform the aspects of the method 1500. The method 1500 may include detection of a full duplex beam failure for a first full duplex beam pair, at 1002; the indication of a second beam pair for full duplex communication, at 1010, and/or the application of the second full duplex beam pair a period of time after the indication, at 1014, such as described in connection with FIG. 10A.

At 1002, the UE detects a beam failure for a beam pair being used in full duplex communication with the base station. For example, 1002 may be performed by the beam measurement component 1640 of the apparatus 1602 in FIG. 16.

At 1504 the UE may transmit a BFRQ for a secondary cell (SCell) to the base station in a first MAC-CE resource of a PCell or a different (other) SCell. At 1506 the UE may receive a BFR in downlink control information of the PCell or the different SCell. In one aspect, 1504 and 1506 may be performed by the beam pair component 1642 of the apparatus 1602 in FIG. 16

Next, at 1508, the UE may select a new full duplex beam pair, for example based on the beam pair that minimizes self-interference. Next, at 1010 the UE indicates to the base station the new full duplex beam pair. This may be done by transmitting a MAC-CE that indicates the new beam pair. For example, the MAC-CE may be transmitted on a PUSCH of the PCell or the different SCell. In one aspect, 1508 and 1010 may be performed by the beam pair component 1642 of the apparatus 1602 in FIG. 16.

At 1014, the UE then applies the new full duplex beam pair to reset full duplex communication after determining that a trigger has occurred. For example, the trigger may be the passing of a predetermined amount of time or a predetermined number of slots after indicating the new beam pair to the base station. In one aspect, 1014 may be performed by the beam pair component 1642 of the apparatus 1602 in FIG. 16.

At 1514, the UE may receive confirmation of the new beam pair from the base station. 1514 may be performed by the beam pair component 1642 of the apparatus 1602 in FIG. 16. For example, the confirmation may be received via a MAC-CE ACK message or in DCI of the PCell or the different SCell.

FIG. 16 is a diagram 1600 illustrating an example of a hardware implementation for an apparatus 1602. The apparatus 1602 may be a UE, a component of a UE, or more implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see 350 of FIG. 3) and include the additional modules of the apparatus 1602.

The communication manager 1632 includes a beam measurement component 1640 that is configured to detect a beam failure of a first beam pair for full duplex communication with the base station, e.g., as described in connection with 1002 in FIG. 10A, 10B, or 11-15. The beam measurement component 1640 may also be configured to measure self-interference amongst a set of candidate beams, e.g., as described in connection with 1004-1006 of FIG. 10A or 10B. The communication manager 1632 further includes a beam pair component 1642 that receives input in the form of measurements from the beam measurement component 1640 and is configured to select a new beam pair for full duplex communication, e.g., as described in connection with 1008 of FIG. 10B. The beam pair component 1642 may be configured to transmit an indication of the second beam pair for full duplex communication to the base station, e.g., via the transmission component 1634 and the cellular RF transceiver 1622, e.g., as in 1010 of FIGS. 10A-15. The communication manager 1632 may further includes a trigger component 1644 that is configured to apply the second beam pair for full duplex communication a period of time after the indication of the second beam pair to the base station, e.g., as in 1014 of FIGS. 10A-15. The trigger component 1644 may be configured to identify the occurrence of a predetermined trigger after which the UE applies the new beam pair for full duplex communication, e.g., as described in connection with 1012 and 1014 of FIG. 10A or 10B. In one aspect the trigger component 1644 may receive a configuration of the trigger from the base station.

The apparatus may include additional components that perform each of the blocks of the algorithm in the flowcharts of FIGS. 10A-15, and/or the aspects performed by the UE in FIG. 6, 8, or 9. As such, each block in the flowcharts of FIGS. 10A-15, and/or the aspects performed by the UE in FIG. 6, 8, or 9, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for detecting a beam failure for a first beam pair for full duplex communication with a base station; means for indicating the second beam pair for the full duplex communication to the base station; and means for applying the second beam pair for the full duplex communication a period of time after indicating the second beam pair to the base station. The apparatus 1602 may further include means for selecting the second beam pair for the full duplex communication independent of an indication from the base station to select a new beam pair. The apparatus 1602 may further include means for beginning measurement to select the second beam pair prior to transmission of a BFRQ, the second beam pair for the full duplex communication being associated with the BFRQ. The apparatus 1602 may further include means for transmitting a self-interference RACH preamble on each of a set of candidate beams; and means for measuring self-interference from transmission of the RACH preamble for each beam pair from the set of candidate beams, wherein the second beam pair is selected based on the self-interference measured for each beam pair from the set of candidate beams. The apparatus 1602 may further include means for transmitting a BFRQ; means for transmitting a self-interference RACH preamble on each of a set of candidate beams; and means for measuring, after transmission of the BFRQ, self-interference from transmission of the RACH preamble for each beam pair from the set of candidate beams, wherein the second beam pair is selected based on the self-interference measured for each beam pair from the set of candidate beams. The apparatus 1602 may further include means for receiving a configuration of SRS resources from the base station in response to the BFRQ, wherein the self-interference for a set of candidate beam pairs is measured based on transmissions in the SRS resources. The apparatus 1602 may further include means for transmitting a BFRQ for a PCell in a CFRA message; means for receiving a BFR in a RAR from the base station; and means for transmitting a MAC-CE on a PUSCH resource, the MAC-CE including an indication of the second beam pair for the full duplex communication with the base station. The apparatus 1602 may further include means for receiving from the base station, a confirmation of the second beam pair in an ACK of the MAC-CE or in DCI. The apparatus 1602 may further include means for transmitting a BFRQ for a PCell in a first a CBRA message; means for receiving a BFR in a second random access message including a RAR from the base station; and means for transmitting a MAC-CE in a third random access message, the MAC-CE including an indication of the second beam pair for the full duplex communication with the base station. The apparatus 1602 may further include means for receiving from the base station, a confirmation of the second beam pair in a fourth random access message from the base station. The apparatus 1602 may further include means for transmitting a first a CBRA message to a PCell; means for receiving a BFR in a second random access message including a RAR from the PCell; means for transmitting a BFRQ in a third random access message to the PCell; means for receiving a fourth random access message from the PCell; and means for transmitting a MAC-CE including an indication of the second beam pair for the full duplex communication with the base station. The apparatus 1602 may further include means for receiving, from the base station, a confirmation of the second beam pair in an ACK of the MAC-CE or in DCI. The apparatus 1602 may further include means for transmitting a BFRQ for a PCell on an uplink beam of the first beam pair; means for receiving a beam failure response in DCI with an uplink grant; and means for transmitting a MAC-CE on a PUSCH based on the uplink grant, the MAC-CE including an indication of the second beam pair for the full duplex communication with the base station. The apparatus 1602 may further include means for receiving, from the base station, a confirmation of the second beam pair in an ACK of the MAC-CE or in an additional DCI. The apparatus 1602 may further include means for transmitting a BFRQ for an SCell to the base station in a first MAC-CE resource of a PCell or a different SCell. The apparatus 1602 may further include means for receiving a beam failure response in DCI of the PCell or the different SCell; and means for transmitting a second MAC-CE on a PUSCH of the PCell or the different SCell, the MAC-CE including an indication of the second beam pair for the full duplex communication for the SCell. The apparatus 1602 may further include means for receiving, from the base station, a confirmation of the second beam pair in an ACK of the MAC-CE or in an additional DCI of the PCell or the different SCell.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

FIGS. 17-21 are flowcharts of methods of wireless communication in accordance with various aspects of the present disclosure.

FIG. 17A is a flowchart of a method 1700 of wireless communication. The method may be performed by a base station (e.g., the base station 102/180; the apparatus 2202) in full duplex communication with a UE. In some aspects, the method may be performed by the apparatus 2202 in FIG. 22, which includes memory and at least one processor, the apparatus including one or more components configured to perform the aspects of the method 1700.

At 1702, the base station receives a BFRQ from the UE, where the BFRQ indicates a beam failure for a first beam pair being used for full duplex communication between the base station and the UE. In an aspect, 1702 may be performed by the beam failure response component 2240 of FIG. 22. FIG. 8 and FIG. 9 illustrate additional examples of a base station receiving a BFRQ. FIGS. 4A-C and 5 illustrate examples aspects of full duplex communication.

At 1708, the base station receives an indication of a second beam pair selected by the UE for the full duplex communication at the UE that the UE will apply a period of time after the indication. In one aspect, the base station receives the indication of the new beam pair without indicating for the UE to select a new beam pair. Aspects described herein may reduce latency when resetting full duplex communication. In an aspect, 1708 may be performed by the beam failure response component 2240 of FIG. 22. FIG. 8 illustrates an example in which the base station may receive an indication of the new beam pair for full duplex communication with a BFRQ. FIG. 9 illustrates an example in which the base station may receive an indication of the new beam pair for full duplex communication after a BFRQ from the UE.

FIG. 17B is a flowchart of a method 1750 of wireless communication. The method may be performed by a base station (e.g., the base station 102/180; the apparatus 2202) in full duplex communication with a UE. In some aspects, the method may be performed by the apparatus 2202 in FIG. 22, which includes memory and at least one processor, the apparatus including one or more components configured to perform the aspects of the method 1750. The method 1750 may include reception of a BFRQ from the UE, where the BFRQ indicates a beam failure for a first beam pair being used for full duplex communication between the base station and the UE, at 1702; and/or reception of an indication of a second beam pair selected by the UE for the full duplex communication at the UE that the UE will apply a period of time after the indication, at 1708, such as described in connection with FIG. 17A.

At 1704, the base station may transmit to the UE a configuration of a trigger. For example, the trigger may be a period of time or a number of slots after receiving the indication of the new beam pair selected by the UE. At 1706, the base station may configure SRS resources for the UE to measure self-interference for a set of candidate beams. In an aspect, 1704 and 1706 may be performed by the UE configuration component 2242 of FIG. 22.

Figure 18:
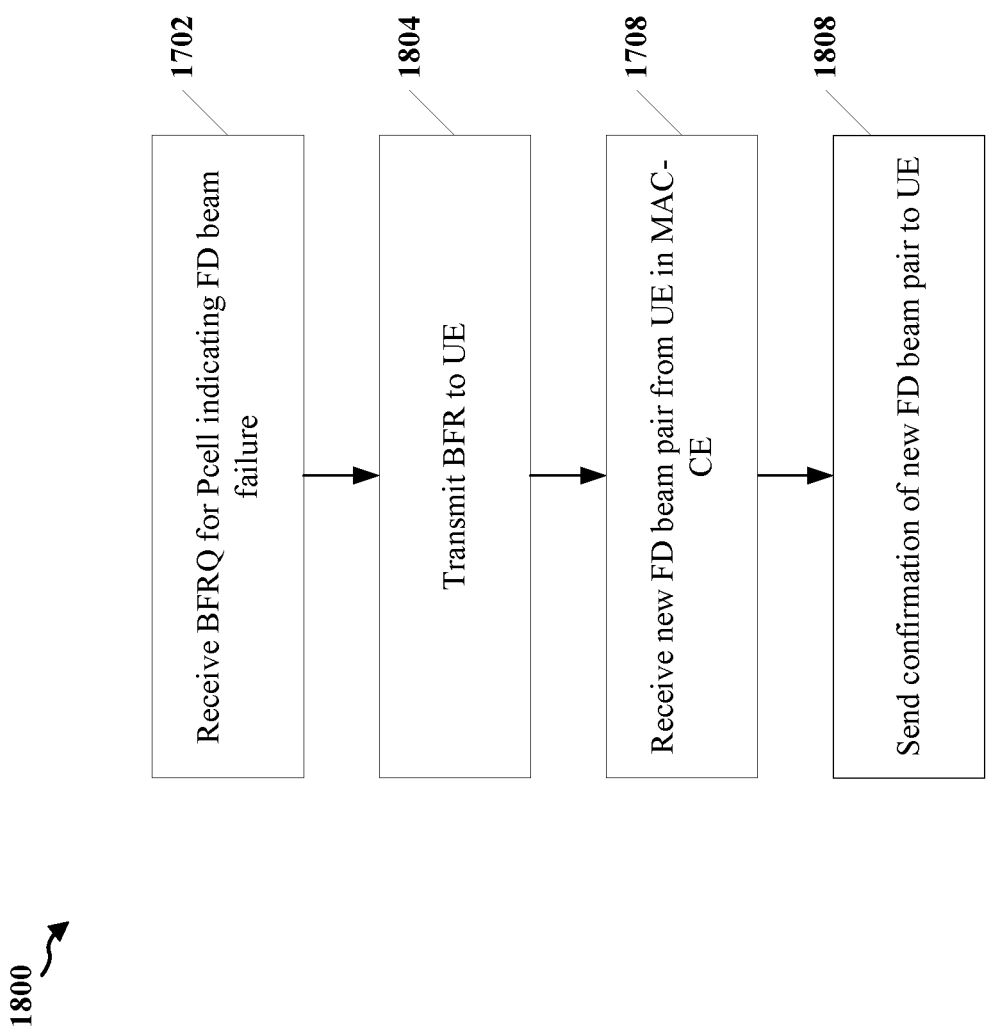

FIG. 18 is a flowchart of a method 1800 of wireless communication. The method may be performed by a base station (e.g., the base station 102/180; the apparatus 2202) in full duplex communication with a UE. In some aspects, the method may be performed by the apparatus 2202 in FIG. 22, which includes memory and at least one processor, the apparatus including one or more components configured to perform the aspects of the method 1800. The method 1800 may include reception of a BFRQ from the UE, where the BFRQ indicates a beam failure for a first beam pair being used for full duplex communication between the base station and the UE, at 1702; and/or reception of an indication of a second beam pair selected by the UE for the full duplex communication at the UE that the UE will apply a period of time after the indication, at 1708, such as described in connection with FIG. 17A.

At 1702, the base station receives a BFRQ for a PCell, where the BFRQ indicates a beam failure for a beam pair being used for full duplex communication between the base station and the UE. For example, the BFRQ may be received in a CFRA message from the UE or in a CBRA message from the UE. In an aspect, 1702 may be performed by the beam failure response component 2240 of FIG. 22.

At 1804, the base station may transmit a BFR to the UE. For example, the BFR may be transmitted to the UE in a RAR or in a random access message including a RAR. In an aspect, 1804 may also be performed by the beam failure response component 2240 of FIG. 22.

At 1708, the base station receives an indication of a new beam pair selected by the UE for the full duplex communication at the UE. In one aspect, the base station receives the indication of the new beam pair in a MAC-CE on a PUSCH resource from the UE. In another aspect, the base station receives the indication of the new beam pair in a MAC-CE in a random access message from the UE. In an aspect, 1708 may also be performed by the beam failure response component 2240 of FIG. 22.

At 1808, the base station may send a confirmation of the new full duplex beam pair to the UE. For example, the confirmation may be sent in a MAC-CE ACK, or in DCI, or in a random access message. In an aspect, 1808 may be performed by the confirmation component 2246 of FIG. 22.

Figure 19:

FIG. 19 is a flowchart of a method 1900 of wireless communication. The method may be performed by a base station (e.g., the base station 102/180; the apparatus 2202) in full duplex communication with a UE. In some aspects, the method may be performed by the apparatus 2202 in FIG. 22, which includes memory and at least one processor, the apparatus including one or more components configured to perform the aspects of the method 1900. The method 1900 may include reception of a BFRQ from the UE, where the BFRQ indicates a beam failure for a first beam pair being used for full duplex communication between the base station and the UE, at 1702; and/or reception of an indication of a second beam pair selected by the UE for the full duplex communication at the UE that the UE will apply a period of time after the indication, at 1708, such as described in connection with FIG. 17A.

At 1902, the base station receives a CBRA at a PCell. Next, at 1904 the base station transmits a BFR from the PCell, where the BFR includes a RAR. At 1702, the base station receives a BFRQ at the PCell, where the BFRQ indicates a beam failure for a beam pair being used for full duplex communication between the base station and the UE. For example, the BFRQ may be received in a random access message from the UE. In an aspect, 1902, 1904 and 1702 may be performed by the beam failure response component 2240 of FIG. 22.

At 1908, the base station may transmit a random access message to the UE, where the random access message includes a RAR. In an aspect, 1908 may also be performed by the beam failure response component 2240 of FIG. 22.

At 1708, the base station receives an indication of a new beam pair selected by the UE for the full duplex communication at the UE. In one aspect, the base station receives the indication of the new beam pair in a MAC-CE. In an aspect, 1708 may also be performed by the beam failure response component 2240 of FIG. 22.

At 1912, the base station may send a confirmation of the new full duplex beam pair to the UE. For example, the confirmation may be sent in a MAC-CE ACK, or in DCI. In an aspect, 1908 may be performed by the confirmation component 2246 of FIG. 22.

Figure 20:
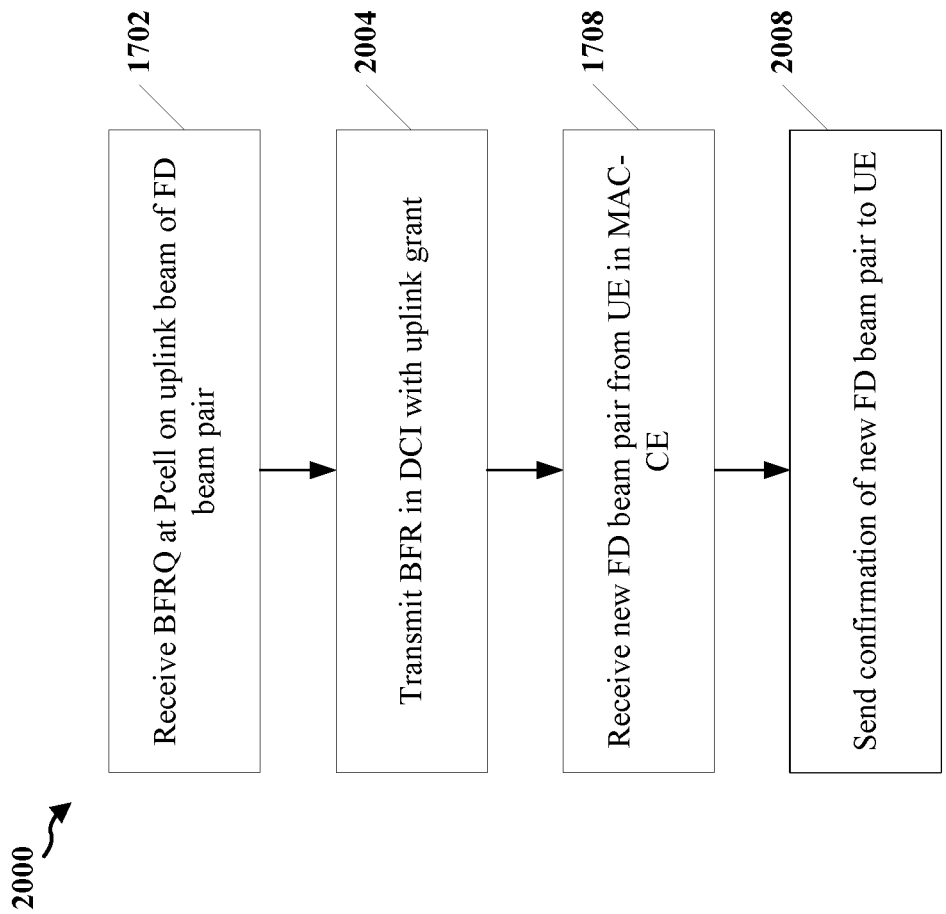

FIG. 20 is a flowchart of a method 2000 of wireless communication. The method may be performed by a base station (e.g., the base station 102/180; the apparatus 2202) in full duplex communication with a UE using a beam pair. In some aspects, the method may be performed by the apparatus 2202 in FIG. 22, which includes memory and at least one processor, the apparatus including one or more components configured to perform the aspects of the method 2000. The method 2000 may include reception of a BFRQ from the UE, where the BFRQ indicates a beam failure for a first beam pair being used for full duplex communication between the base station and the UE, at 1702; and/or reception of an indication of a second beam pair selected by the UE for the full duplex communication at the UE that the UE will apply a period of time after the indication, at 1708, such as described in connection with FIG. 17A.

At 1702, the base station receives a BFRQ for a PCell on an uplink beam of the beam pair. For example, the BFRQ may indicate a beam failure for the beam pair being used for full duplex communication between the base station and the UE. In an aspect, the BFRQ may be received in a UCI, on a PUCCH or in a MAC-CE on a PUSCH. In an aspect, 1702 may be performed by the beam failure response component 2240 of FIG. 22.

At 2004, the base station may transmit a BFR to the UE in DCI with an uplink grant. In an aspect, 2004 may be performed by the resource grant component 2244 of FIG. 22.

At 1708, the base station receives an indication of a new beam pair selected by the UE for the full duplex communication at the UE. In one aspect, the base station receives the indication of the new beam pair in a MAC-CE on a PUSCH resource from the UE based on the uplink grant. In an aspect, 1708 may also be performed by the beam failure response component 2240 of FIG. 22.

At 2008, the base station may send a confirmation of the new full duplex beam pair to the UE. For example, the confirmation may be sent in a MAC-CE ACK, or in DCI. In an aspect, 2008 may be performed by the confirmation component 2246 of FIG. 22.

Figure 21:
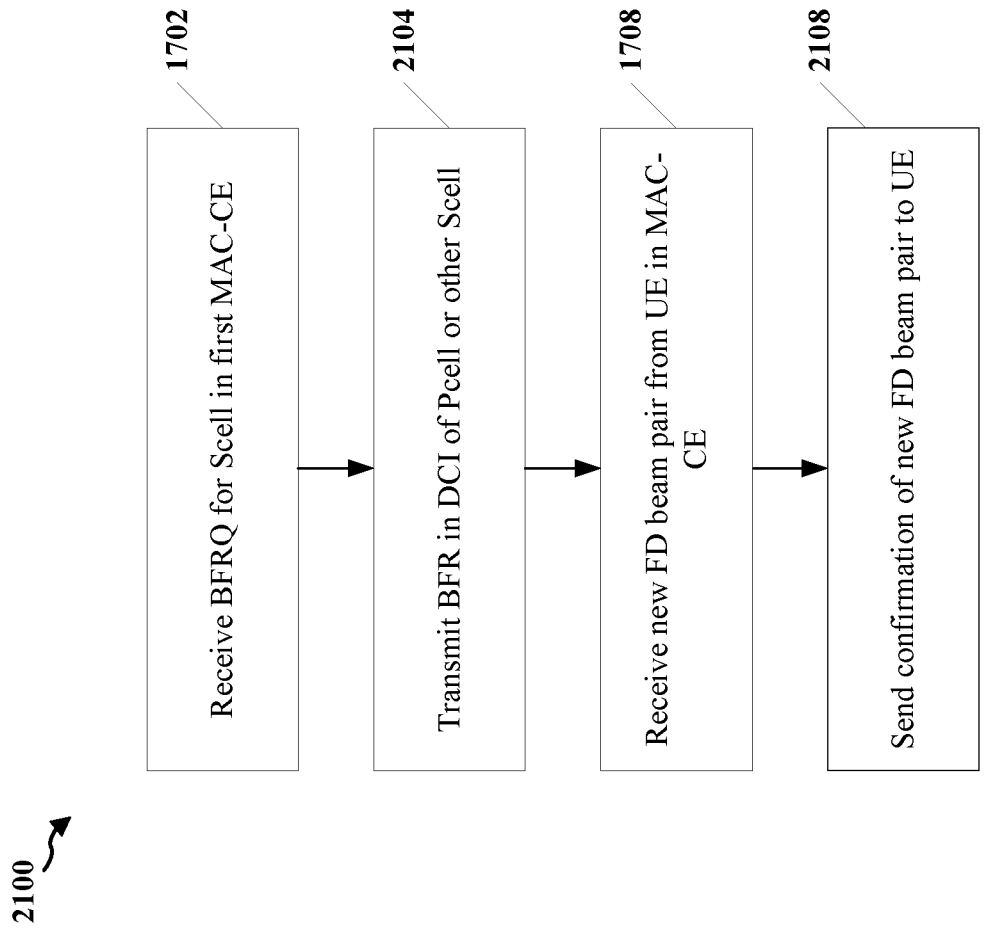

FIG. 21 is a flowchart of a method 2100 of wireless communication. The method may be performed by a base station (e.g., the base station 102/180; the apparatus 2202) in full duplex communication with a UE using a beam pair. In some aspects, the method may be performed by the apparatus 2202 in FIG. 22, which includes memory and at least one processor, the apparatus including one or more components configured to perform the aspects of the method 2100. The method 2100 may include reception of a BFRQ from the UE, where the BFRQ indicates a beam failure for a first beam pair being used for full duplex communication between the base station and the UE, at 1702; and/or reception of an indication of a second beam pair selected by the UE for the full duplex communication at the UE that the UE will apply a period of time after the indication, at 1708, such as described in connection with FIG. 17A.

At 1702, the base station receives a BFRQ for a SCell in a MAC-CE resource of a PCell or a different (other) SCell. For example, the BFRQ may indicate a beam failure for the beam pair being used for full duplex communication between the base station and the UE. In an aspect, 1702 may be performed by the beam failure response component 2240 of FIG. 22.

At 2104, the base station may transmit a BFR to the UE in DCI of the PCell or of the different (other) SCell. In an aspect, 2104 may be performed by the beam failure response component 2240 of FIG. 22.

At 1708, the base station receives an indication of a new beam pair selected by the UE for the full duplex communication at the UE. In one aspect, the base station receives the indication of the new beam pair in a MAC-CE on a PUSCH resource of the PCell or the different (other) SCell. In an aspect, 1708 may also be performed by the beam failure response component 2240 of FIG. 22.

At 2108, the base station may send a confirmation of the new full duplex beam pair to the UE. For example, the confirmation may be sent in a MAC-CE ACK, or in DCI. In an aspect, 2108 may be performed by the confirmation component 2246 of FIG. 22.

Figure 22:
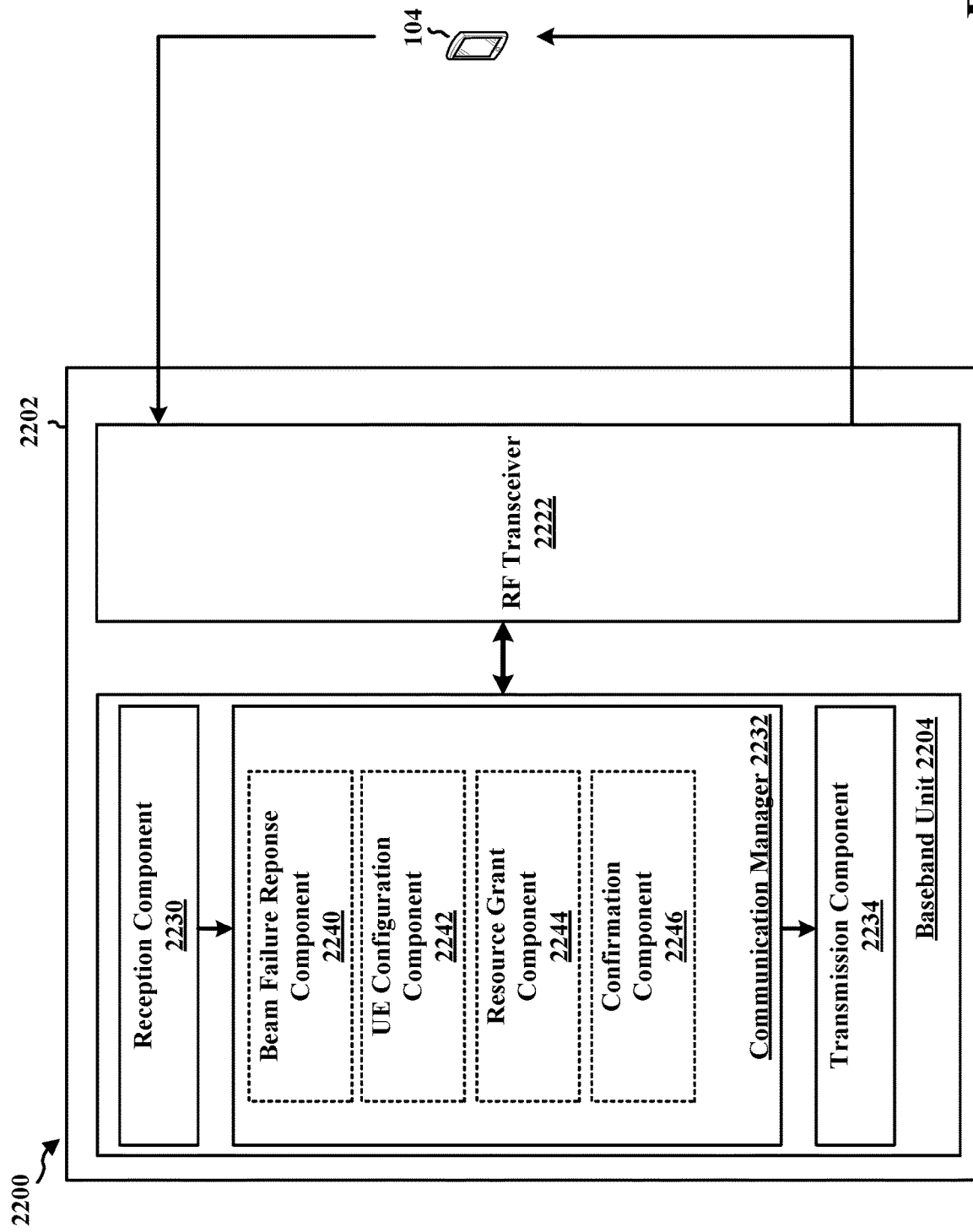
FIG. 22 is a diagram illustrating an example of a hardware implementation for an example base station apparatus.

FIG. 22 is a diagram 2200 illustrating an example of a hardware implementation for an example apparatus 2202. The apparatus 2202 may be a base station, a component of a base station, or may implement base station functionality. In some aspects, the apparatus 2202 may include a baseband unit 2204. The baseband unit 2204 may communicate through a cellular RF transceiver 2222 with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the base station 310 and may include the memory 376 and/or at least one of the TX processor 316, the RX processor 370, and the controller/processor 375.

The communication manager 2232 includes a beam failure response component 2240 that is configured to receive a BFRQ from the UE, where the BFRQ indicates a beam failure for a first beam pair being used for full duplex communication between the base station and the UE, e.g., as described in connection with 1702 in FIGS. 17A-21. The beam failure response component 2240 may be configured to receive an indication of a second beam pair selected by the UE for the full duplex communication at the UE that the UE will apply a period of time after the indication, e.g., as described in connection with 1708 in FIGS. 17A-21. The beam failure response component 2240 may be configured to receive or transmit a variety of signals to the UE to coordinate resetting of the full duplex communication, e.g., as described in connection with 1804, 1904, and 1908 of FIGS. 18 and 19. The communication manager 2232 further includes a UE configuration component 2242 that is configured to send configurations to the UE, e.g., as described in connection with 1704 or 1706 of FIG. 17B. The communication manager 2232 further includes a resource grant component 2244 that is configured to grant resources to the UE, e.g., as described in connection with 2004 of FIG. 20.

The apparatus may include additional components that perform each of the blocks of the algorithm in the flowcharts of FIGS. 17A-21, and/or the aspects performed by the base station in FIG. 8 or FIG. 9. As such, each block in the flowcharts of FIGS. 17A-21, and/or the aspects performed by the base station in FIG. 8 or FIG. 9, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the baseband unit 2204, includes means for receiving a BFRQ from a UE, the BFRQ indicating a beam failure for a first beam pair for full duplex communication at the UE; and means for receiving an indication of a second beam pair selected by the UE for the full duplex communication at the UE that the UE will apply a period of time after the indication. The apparatus 2202 may further include means for transmitting, to the UE, a configuration of the number of slots or symbols. The apparatus 2202 may further include means for configuring SRS resources for the UE to measure self-interference for a set of candidate beam pairs. The apparatus 2202 may further include means for receiving the BFRQ for a PCell in a CFRA message from the UE; means for transmitting a BFR in a RAR to the UE; and means for receiving a MAC-CE on a PUSCH resource from the UE, the MAC-CE including the indication of the second beam pair for the full duplex communication with the base station. The apparatus 2202 may further include means for transmitting, to the UE, a confirmation of the second beam pair in an ACK of the MAC-CE or in DCI. The apparatus 2202 may further include means for receiving the BFRQ for a PCell in a first a CBRA message; means for transmitting a BFR in a second random access message including a RAR; and means for receiving a MAC-CE in a third random access message from the UE, the MAC-CE including the indication of the second beam pair for the full duplex communication at the UE. The apparatus 2202 may further include means for transmitting, to the UE, a confirmation of the second beam pair in a fourth random access message. The apparatus 2202 may further include means for receiving a first a CBRA message at a PCell; means for transmitting a BFR in a second random access message including a RAR from the PCell; means for receiving the BFRQ in a third random access message at the PCell; means for transmitting a fourth random access message from the PCell; and means for receiving a MAC-CE including the indication of the second beam pair for the full duplex communication at the UE. The apparatus 2202 may further include means for transmitting, to the UE, a confirmation of the second beam pair in an ACK of the MAC-CE or in DCI. The apparatus 2202 may further include means for receiving a BFRQ for a PCell on an uplink beam of the first beam pair; means for transmitting a beam failure response in DCI with an uplink grant; and means for receiving a MAC-CE on a PUSCH based on the uplink grant, the MAC-CE including an indication of the second beam pair for the full duplex communication at the UE. The apparatus 2202 may further include means for transmitting, to the UE, a confirmation of the second beam pair in an ACK of the MAC-CE or in a DCI. The apparatus 2202 may further include means for receiving the BFRQ for a SCell in a first MAC-CE resource of a PCell or a different SCell; means for transmitting a beam failure response in DCI of the PCell or the different SCell; and means for receiving a second MAC-CE on a PUSCH of the PCell or the different SCell, the MAC-CE including the indication of the second beam pair for the full duplex communication for the SCell. The apparatus 2202 may further include means for transmitting, to the UE, a confirmation of the second beam pair in an ACK of the MAC-CE or in a DCI of the PCell or the different SCell.

The means may be one or more of the components of the apparatus 2202 configured to perform the functions recited by the means. As described supra, the apparatus 2202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: detecting a beam failure for a first beam pair for full duplex communication with a base station; indicating the second beam pair for the full duplex communication to the base station; and applying the second beam pair for the full duplex communication a period of time after indicating the second beam pair to the base station.

In aspect 2, the method of aspect 1 further includes that the UE selects the second beam pair for the full duplex communication independent of an indication from the base station to select a new beam pair.

In aspect 3, the method of aspect 1 or aspect 2 further includes that the period of time is based on a number of slots after indicating the second beam pair to the base station or a number of symbols after indicating the second beam pair to the base station.

In aspect 4, the method of aspect 3 further includes that the number of slots or symbols is defined.

In aspect 5, the method of aspect 3 further includes receiving, from the base station, a configuration of the number of slots or symbols.

In aspect 6, the method of any of aspects 1-5 further includes beginning measurement to select the second beam pair prior to transmitting a BFRQ.

In aspect 7, the method of aspect 6 further includes that the UE indicates the second beam pair for the full duplex communication associated with the BFRQ.

In aspect 8, the method of aspect 6 or aspect 7 further includes that the measurement to select the second beam pair includes: transmitting a self-interference RACH preamble on each of a set of candidate beams; and measuring self-interference from transmission of the RACH preamble for each beam pair from the set of candidate beams, wherein the UE selects the second beam pair based on the self-interference measured for each beam pair from the set of candidate beams.

In aspect 9, the method of any of aspects 1-5 further includes transmitting a BFRQ, wherein the UE begins or conducts measurements to select the second beam pair after transmitting the BFRQ.

In aspect 10, the method of aspect 9 further includes beginning or conducting the measurements includes: transmitting a self-interference RACH preamble on each of a set of candidate beams; and measuring self-interference from transmission of the RACH preamble for each beam pair from the set of candidate beams, wherein the UE selects the second beam pair based on the self-interference measured for each beam pair from the set of candidate beams.

In aspect 11, the method of aspect 9 further including receiving a configuration of SRS resources from the base station in response to the BFRQ, wherein the UE measures self-interference for a set of candidate beam pairs based on transmissions in the SRS resources.

In aspect 12, the method of any of aspects 1-11 further includes transmitting a BFRQ for a PCell in a CFRA message; receiving a BFR in a RAR from the base station; and transmitting a MAC-CE on a PUSCH resource, the MAC-CE including an indication of the second beam pair for the full duplex communication with the base station.

In aspect 13 the method of aspect 12 further includes that the RAR schedules the PUSCH resource for the UE to indicate the second beam pair.

In aspect 14, the method of aspect 12 or 13 further includes receiving, from the base station, a confirmation of the second beam pair in an ACK of the MAC-CE or in DCI.

In aspect 15, the method of any of aspects 1-11 further includes transmitting a BFRQ for a PCell in a first a CBRA message; receiving a BFR in a second random access message including a RAR from the base station; and transmitting a MAC-CE in a third random access message, the MAC-CE including an indication of the second beam pair for the full duplex communication with the base station.

In aspect 16, the method of aspect 15 further includes receiving, from the base station, a confirmation of the second beam pair in a fourth random access message from the base station.

In aspect 17, the method of any of aspects 1-11 further includes transmitting a first a CBRA message to a PCell; receiving a BFR in a second random access message including a RAR from the PCell; transmitting a BFRQ in a third random access message to the PCell; receiving a fourth random access message from the PCell; and transmitting a MAC-CE including an indication of the second beam pair for the full duplex communication with the base station.

In aspect 18, the method of aspect 17 further includes receiving, from the base station, a confirmation of the second beam pair in an ACK of the MAC-CE or in DCI.

In aspect 19, the method of any of aspects 1-11 further includes transmitting a BFRQ for a PCell on an uplink beam of the first beam pair; receiving a beam failure response in DCI with an uplink grant; and transmitting a MAC-CE on a PUSCH based on the uplink grant, the MAC-CE including an indication of the second beam pair for the full duplex communication with the base station.

In aspect 20, the method of aspect 19 further includes that the UE transmits the BFRQ in at least one of: UCI on a PUCCH, or a second medium access control-control element on the PUSCH.

In aspect 21, the method of any of aspects 19 or 20 further includes receiving, from the base station, a confirmation of the second beam pair in an acknowledgment (ACK) of the MAC-CE or in a DCI.

In aspect 22, the method of any of aspects 1-11 further includes transmitting a BFRQ for an SCell to the base station in a first MAC-CE resource of a PCell or a different SCell; receiving a beam failure response in DCI of the PCell or the different SCell; and transmitting a second MAC-CE on a PUSCH of the PCell or the different SCell, the MAC-CE including an indication of the second beam pair for the full duplex communication for the SCell.

In aspect 23, the method of aspect 22 further includes receiving, from the base station, a confirmation of the second beam pair in an ACK of the MAC-CE or in DCI of the PCell or the different SCell.

Aspect 24 is an apparatus for wireless communication at a UE, comprising means to perform the method of any of aspects 1-23.

In aspect 25, the apparatus of aspect 24 further includes at least one antenna and a transceiver coupled to the at least one antenna.

Aspect 26 is an apparatus for wireless communication at a UE, comprising: memory; and at least one processor coupled to the memory, the memory and at least one processor being configured to perform the method of any of aspects 1-23.

In aspect 27, the apparatus of aspect 26 further includes at least one antenna and a transceiver coupled to the at least one antenna and the at least one processor.

Aspect 28 is a non-transitory computer-readable medium storing computer executable code for wireless communication at a UE, the code when executed by a processor cause the processor to perform the method of any of aspects 1-23.

Aspect 29 is a method of wireless communication at a base station, comprising: receiving a BFRQ from a UE, the BFRQ indicating a beam failure for a first beam pair for full duplex communication at the UE; and receiving an indication of a second beam pair selected by the UE for the full duplex communication at the UE that the UE will apply a period of time after the indication.

In aspect 30, the method of aspect 29 further includes that the base station receives the indication of the second beam pair from the UE independent of an indication for the UE to select a new beam pair.

In aspect 31, the method of aspect 29 or aspect 30 further includes that the period of time is based on a number of slots after receiving the indication of the second beam pair selected by the UE or a number of symbols after receiving the indication of the second beam pair selected by the UE.

In aspect 32, the method of aspect 31 further includes that the number of slots or symbols is defined.

In aspect 33, the method of aspect 31 further includes transmitting, to the UE, a configuration of the number of slots or symbols.

In aspect 34, the method of any of aspects 29-33 the base station receives the indication of the second beam pair associated with the BFRQ.

In aspect 35, the method of any of aspects 29-34 further includes configuring SRS resources for the UE to measure self-interference for a set of candidate beam pairs.

In aspect 36, the method of any of aspects 29-35 further includes receiving the BFRQ for a PCell in a CFRA message from the UE; transmitting a BFR in a RAR to the UE; and receiving a MAC-CE on a PUSCH resource from the UE, the MAC-CE including the indication of the second beam pair for the full duplex communication with the base station.

In aspect 37, the method of aspect 36 further includes that the RAR schedules the PUSCH resource for the UE to indicate the second beam pair.

In aspect 38, the method of aspect 36 or 37 further includes transmitting, to the UE, a confirmation of the second beam pair in an ACK of the MAC-CE or in DCI.

In aspect 39, the method of any of aspects 29-35 further includes receiving the BFRQ for a PCell in a first a CBRA message; transmitting a BFR in a second random access message including a RAR; and receiving a MAC-CE in a third random access message from the UE, the MAC-CE including the indication of the second beam pair for the full duplex communication at the UE.

In aspect 40, the method of aspect 39 further includes transmitting, to the UE, a confirmation of the second beam pair in a fourth random access message.

In aspect 41, the method of any of aspects 29-35 further includes receiving a first a CBRA message at a PCell; transmitting a BFR in a second random access message including a RAR from the PCell; receiving the BFRQ in a third random access message at the PCell; transmitting a fourth random access message from the PCell; and receiving a MAC-CE including the indication of the second beam pair for the full duplex communication at the UE.

In aspect 42, the method of aspect 41 further includes transmitting, to the UE, a confirmation of the second beam pair in an ACK of the MAC-CE or in DCI.

In aspect 43, the method of any of aspects 29-35 further includes receiving the BFRQ for a PCell on an uplink beam of the first beam pair; transmitting a beam failure response in DCI with an uplink grant; and receiving a MAC-CE on a PUSCH based on the uplink grant, the MAC-CE including an indication of the second beam pair for the full duplex communication at the UE.

In aspect 44, the method of aspect 43 further includes that the base station receives the BFRQ in at least one of: UCI on a PUCCH, or a second medium access control-control element on the PUSCH.

In aspect 45, the method of aspect 43 or 44 further includes transmitting, to the UE, a confirmation of the second beam pair in an acknowledgment (ACK) of the MAC-CE or in a DCI.

In aspect 46, the method of any of aspects 29-35 further includes receiving the BFRQ for a SCell in a first MAC-CE resource of a PCell or a different SCell; transmitting a beam failure response in DCI of the PCell or the different SCell; and receiving a second MAC-CE on a PUSCH of the PCell or the different SCell, the MAC-CE including the indication of the second beam pair for the full duplex communication for the SCell.

In aspect 47, the method of aspect 46 further includes transmitting, to the UE, a confirmation of the second beam pair in an ACK of the MAC-CE or in a DCI of the PCell or the different SCell.

Aspect 48 is an apparatus for wireless communication at a base station, comprising means to perform the method of any of aspects 29-47.

In aspect 49, the apparatus of aspect 48 further includes at least one antenna and a transceiver coupled to the at least one antenna.

Aspect 50 is an apparatus for wireless communication at a base station, comprising: memory; and at least one processor coupled to the memory, the memory and at least one processor being configured to perform the method of any of aspects 29-47.

In aspect 51, the apparatus of aspect 50 further includes at least one antenna and a transceiver coupled to the at least one antenna and the at least one processor.

Aspect 52 is a non-transitory computer-readable medium storing computer executable code for wireless communication at a base station, the code when executed by a processor cause the processor to perform the method of any of aspects 29-47.

What is claimed is:

1. An apparatus for wireless communication at a user equipment (UE), comprising at least one processor coupled to memory and configured to:
    detect a beam failure for a first beam pair for full duplex communication with a base station;
    indicate a second beam pair for the full duplex communication to the base station; and
    apply the second beam pair for the full duplex communication a period of time after indicating the second beam pair to the base station,
    wherein the at least one processor is further configured to:
        transmit a beam failure recovery request (BFRQ) for a primary cell (PCell) in a contention free random access (CFRA) message or in a contention based random access (CBRA) message;
        receive a beam failure response (BFR) in a random access response (RAR) from the base station; and
        transmit a medium access control-control element (MAC-CE) on a physical uplink shared channel (PUSCH) resource or in a second random access message, the MAC-CE including an indication of the second beam pair for the full duplex communication with the base station.

2. The apparatus of claim 1, wherein the at least one processor is are further configured to:
    transmit the beam failure recovery request (BFRQ) for the primary cell (PCell) in the contention free random access (CFRA) message;
    receive the beam failure response (BFR) in the random access response (RAR) from the base station; and
    transmit the medium access control-control element (MAC-CE) on the physical uplink shared channel (PUSCH) resource, the MAC-CE including the indication of the second beam pair for the full duplex communication with the base station.

3. The apparatus of claim 2, wherein the RAR schedules the PUSCH resource for the UE to indicate the second beam pair, the at least one processor being further configured to:
    receive, from the base station, a confirmation of the second beam pair in an acknowledgment (ACK) of the MAC-CE or in downlink control information (DCI).

4. The apparatus of claim 1, wherein the at least one processor is are further configured to:
    transmit the beam failure recovery request (BFRQ) for the primary cell (PCell) in the contention based random access (CBRA) message;
    receive the beam failure response (BFR) in a third random access message including the random access response (RAR) from the base station; and
    transmit the medium access control-control element (MAC-CE) in the second random access message, the MAC-CE including the indication of the second beam pair for the full duplex communication with the base station.

5. The apparatus of claim 4, wherein the at least one processor is further configured to:
    receive, from the base station, a confirmation of the second beam pair in a fourth random access message from the base station.

6. An apparatus for wireless communication at a user equipment (UE), comprising at least one processor, coupled to memory and configured to:
    detect a beam failure for a first beam pair for full duplex communication with a base station;
    indicate a second beam pair for the full duplex communication to the base station; and
    apply the second beam pair for the full duplex communication a period of time after indicating the second beam pair to the base station,
    wherein the at least one processor is further configured to:
        begin measurement to select the second beam pair prior to transmission of a beam failure recovery request (BFRQ), the second beam pair for the full duplex communication being associated with the BFRQ;
        transmit the beam failure recovery request (BFRQ);
        transmit a self-interference random access channel (RACH) preamble on each of a set of candidate beams; and measure self-interference from transmission of the RACH preamble for each beam pair from the set of candidate beams, wherein the second beam pair is selected based on the self-interference measured for each beam pair from the set of candidate beams; or
        transmit the beam failure recovery request (BFRQ); transmit the self-interference random access channel (RACH) preamble on each of the set of candidate beams; and measure, after transmission of the BFRQ, the self-interference from transmission of the RACH preamble for each beam pair from the set of candidate beams, wherein the second beam pair is selected based on the self-interference measured for each beam pair from the set of candidate beams.

7. The apparatus of claim 6, wherein the at least one processor is further configured to transmit the beam failure recovery request (BFRQ) and to begin measurement to select the second beam pair prior to transmission of the beam failure recovery request (BFRQ), the second beam pair for the full duplex communication being associated with the BFRQ, and wherein to perform the measurement to select the second beam pair, the at least one processor is configured to:
   transmit the self-interference random access channel (RACH) preamble on each of the set of candidate beams; and
   measure the self-interference from transmission of the RACH preamble for each beam pair from the set of candidate beams, wherein the second beam pair is selected based on the self-interference measured for each beam pair from the set of candidate beams.

8. The apparatus of claim 6, wherein the at least one processor is are further configured to:
   transmit the beam failure recovery request (BFRQ);
   transmit the self-interference random access channel (RACH) preamble on each of the set of candidate beams; and
   measure, after the transmission of the BFRQ, the self-interference from transmission of the RACH preamble for each beam pair from the set of candidate beams, wherein the second beam pair is selected based on the self-interference measured for each beam pair from the set of candidate beams.

9. The apparatus of claim 8, wherein the at least one processor is configured to:
   receive a configuration of sounding reference signal (SRS) resources from the base station in response to the BFRQ, wherein the self-interference for a set of candidate beam pairs is measured based on transmissions in the SRS resources.

10. An apparatus for wireless communication at a user equipment (UE), comprising at least one processor, coupled to memory and configured to:
   detect a beam failure for a first beam pair for full duplex communication with a base station;
   indicate a second beam pair for the full duplex communication to the base station; and
   apply the second beam pair for the full duplex communication a period of time after indicating the second beam pair to the base station,
   wherein the at least one processor is further configured to:
      transmit a first a contention based random access (CBRA) message to a primary cell (PCell);
      receive a beam failure response (BFR) in a second random access message including a random access response (RAR) from the PCell;
      transmit a beam failure recovery request (BFRQ) in a third random access message to the PCell;
      receive a fourth random access message from the PCell; and
      transmit a medium access control-control element (MAC-CE) including an indication of the second beam pair for the full duplex communication with the base station.

11. The apparatus of claim 10, wherein the at least one processor is further configured to:
   receiving, from the base station, a confirmation of the second beam pair in an acknowledgment (ACK) of the MAC-CE or in downlink control information (DCI).

12. An apparatus for wireless communication at a user equipment (UE), comprising at least one processor, coupled to memory and configured to:
   detect a beam failure for a first beam pair for full duplex communication with a base station;
   indicate a second beam pair for the full duplex communication to the base station; and
   apply the second beam pair for the full duplex communication a period of time after indicating the second beam pair to the base station,
   wherein the at least one processor is further configured to:
      transmit a beam failure recovery request (BFRQ) for a primary cell (PCell) on an uplink beam of the first beam pair;
      receive a beam failure response in downlink control information (DCI) with an uplink grant; and
      transmit a medium access control-control element (MAC-CE) on a physical uplink shared channel (PUSCH) based on the uplink grant, the MAC-CE including an indication of the second beam pair for the full duplex communication with the base station.

13. The apparatus of claim 12, wherein the at least one processor is further configured to:
   receive, from the base station, a confirmation of the second beam pair in an acknowledgment (ACK) of the MAC-CE or in an additional DCI.

14. An apparatus for wireless communication at a user equipment (UE), comprising at least one processor, coupled to memory and configured to:
   detect a beam failure for a first beam pair for full duplex communication with a base station;
   indicate a second beam pair for the full duplex communication to the base station; and
   apply the second beam pair for the full duplex communication a period of time after indicating the second beam pair to the base station,
   wherein the at least one processor is further configured to:
      transmit a beam failure recovery request (BFRQ) for a secondary cell (SCell) to the base station in a first medium access control-control element (MAC-CE) resource of a primary cell (PCell) or a different SCell;
      receive a beam failure response in downlink control information (DCI) of the PCell or the different SCell; and
      transmit a second MAC-CE on a physical uplink shared channel (PUSCH) of the PCell or the different SCell, the MAC-CE including an indication of the second beam pair for the full duplex communication for the SCell.

15. The apparatus of claim 14, wherein the at least one processor is further configured to:
   receive, from the base station, a confirmation of the second beam pair in an acknowledgment (ACK) of the MAC-CE or in an additional DCI of the PCell or the different SCell.

* * * * *